US009450433B2

(12) United States Patent
Di Cristofaro

(10) Patent No.: US 9,450,433 B2
(45) Date of Patent: Sep. 20, 2016

(54) METHOD AND SYSTEM FOR CONTROLLING A PORTABLE POWER SYSTEM

(71) Applicant: ECO-H TECHNOLOGIES INC., Hamilton (CA)

(72) Inventor: Vincenzo E. Di Cristofaro, Burlington (CA)

(73) Assignee: ECO-H TECHNOLOGIES INC., Hamilton (CA)

( * ) Notice: Subject to any disclaimer, the term of this patent is extended or adjusted under 35 U.S.C. 154(b) by 335 days.

(21) Appl. No.: 14/284,780

(22) Filed: May 22, 2014

(65) Prior Publication Data
US 2014/0361549 A1  Dec. 11, 2014

Related U.S. Application Data

(60) Provisional application No. 61/826,449, filed on May 22, 2013.

(51) Int. Cl.
*H02J 7/00* (2006.01)
*H02J 1/10* (2006.01)
(Continued)

(52) U.S. Cl.
CPC ............ *H02J 7/0047* (2013.01); *H02J 7/0063* (2013.01); *H02J 7/0068* (2013.01); *H02J 7/32* (2013.01); *H02J 2007/0067* (2013.01); *Y02B 40/90* (2013.01)

(58) Field of Classification Search
CPC ....... Y02E 60/12; H02J 7/022; H02J 7/0055; H02J 7/0031; H02J 1/10; H02J 1/102; H02J 7/34; H02J 7/35; H02J 7/0024; H02J 3/32; H02J 3/382; H02J 9/00; H02J 9/062; H02J 9/061; H02J 7/0063; H02J 7/1423; H02J 15/00; H02J 9/08; H01M 10/44; Y02T 10/7005; Y02T 90/121; G06F 1/26; A61N 1/36032; A61N 1/378; H04R 25/606; B65G 47/261; F02N 11/0866; G05F 1/62; H02P 9/00; H02P 9/04; H02P 23/0045; H02K 7/1823; B63H 23/24; F01D 17/24; F01K 13/02
USPC ................ 320/128, 138; 307/43, 47, 48, 68; 290/4 A, 40 R
See application file for complete search history.

(56) References Cited

U.S. PATENT DOCUMENTS 7,633,248 B1    12/2009  Williams
2002/0051368 A1*  5/2002  Ulinski ..................... H02J 3/32
                                                                   363/1
2007/0188140 A1*  8/2007  Chen ...................... H02J 7/0013
                                                                   320/128

(Continued)

FOREIGN PATENT DOCUMENTS

WO    WO 2011/126661 A2    10/2011

Primary Examiner — Yalkew Fantu
Assistant Examiner — Mohammed J Sharief
(74) Attorney, Agent, or Firm — Conneely PC; Joseph Conneely

(57) ABSTRACT

A method for controlling a portable power system, comprising: using a processor, selecting an engine efficiency range for a engine of a generator set of the portable power system, the engine efficiency range corresponding to a power output range of the generator set and to a power demand of a load coupled to the portable power system; when the power demand of the load is less than the power output of the generator set, storing excess power from the generator set in a first battery bank of the portable power system; when the power demand of the load is greater than the power output of the generator set, providing additional power to the load from a second battery bank of the portable power system; and, when at least one of a predetermined depth of discharge threshold is reached by the second battery bank and a predetermined state of charge threshold is reached by the first battery bank, switching between the second battery bank and the first battery bank.

20 Claims, 44 Drawing Sheets

(51) Int. Cl.
*H02J 3/30* (2006.01)
*H02J 3/32* (2006.01)
*H02J 9/00* (2006.01)
*F02D 25/00* (2006.01)
*F02N 11/06* (2006.01)
*H02J 7/32* (2006.01)

(56) References Cited

U.S. PATENT DOCUMENTS

2012/0223524 A1 9/2012 Williams
2012/0292992 A1 11/2012 Williams
2013/0271083 A1* 10/2013 Williams .................. H02J 3/28
　　　　　　　　　　　　　　　　　　　　　　320/128

* cited by examiner

Synerion® 24E

High energy lithium-ion module 24 V - 2.2 kWh

Synerion 24E module is suited for energy applications requiring high storage capacity and long charge and discharge cycles Built with proven Saft Li-ion technology Synerion 24E provides maintenance-free storage in a reduced volume combining high operational reliability over thousands of cycles with outstanding energy efficiency. Its modular design allows adaptation of the battery configuration through serial or serial/parallel connection to reach energy levels up to hundreds of kWh in one functional entity.

Applications
- Renewables capacity firming supporting integration of wind and solar farms in power systems
- Smart energy management: load levelling, peak shaving, microgrids
- Residential and community energy storage
- UPS

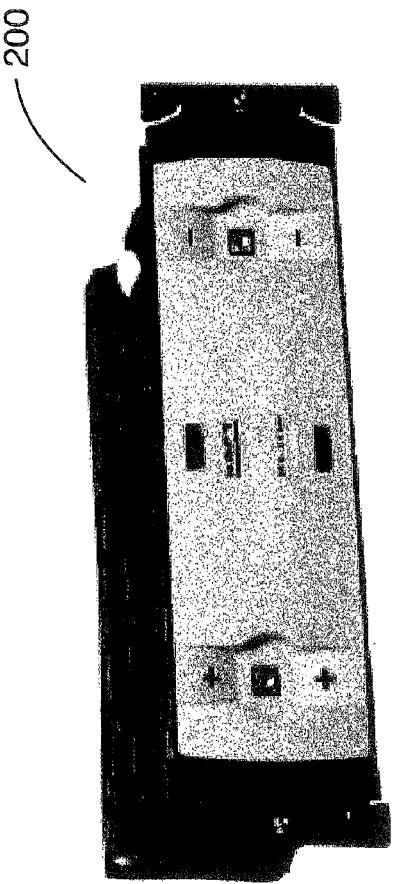

| Nominal characteristics at + 25°C/+ 77°F | |
|---|---|
| Voltage (V) | 24 |
| Capacity (C/5) (Ah) | 87 |
| Rated energy (C/5) (Wh) | 2200 |
| Volumetric energy density (Wh/L) | 128 |
| Gravimetric energy density (Wh/kg) | 119 |
| Mechanical characteristics | |
| Width (mm) | 448 |
| Height (mm) | 131 |
| Depth (mm) | 293 |
| Weight (kg) | 185 |

FIG.3

Features

- Compact module integrating VLE Li-ion cells module supervision and cell balancing
- Advanced industrial design offering highest reliability and robustness
- 20 years design life
- Full energy availability for discharges of one hour or longer
- State of charge and state of health indication through BMM (Battery Management Module)
- Saft's system design experience in high tech industry markets stands for safe reliable and durable product solutions.

Benefits

- Compactness
- Best energy efficiency of all available energy storage systems
- Easy system integration and upscaling (19" rack)
- High operational reliability
- Smart energy management and remote supervision capability
- Preventive but not premature replacement at end of life

| Electrical characteristics at + 25°C/+ 77°F | |
|---|---|
| Voltage (V) | 21 to 28 |
| Maximum continuous discharge current (A) | 160 |
| Maximum continuous discharge power (W) | 3800 |
| Peak discharge power in 5 s(W) | 8500 |
| Maximum continuous recharge current (A) | 45 |
| Maximum continuous recharge power (W) | 1150 |
| Peak recharge power in 5 s (W) | 5500 |
| Recharge time (h) | 3 |
| Module consumption (active mode) | 5 V - 0.45W |
| Insulation resistance (1000 V DC) | >100 MΩ |
| Dielectric | 3 KV rms |
| Operating conditions | |
| Operating temperature | - 20°C/ + 60°C ( - 4°F to + 140°F) |
| Cycle efficiency | 96% to 99% |
| Self-discharge | > 5% per month |
| Calendar lifetime at + 25°C/+ 77°F | > 20 years |
| Cooling | Natural convection |

FIG.3 (Cont'd)

| Storage conditions | |
|---|---|
| Storage temperature | -30°C/+ 70°C(-22°F to 158°F) |
| Storage time | 6 months |
| Maximum altitude | 3000 m above sea level |
| Maximum relative humidity | 95% (non condensing) |
| Compliance to standards | |
| Cell safety | UL 1442 |
| Module safety | EN 50178 / IEC 60950 / CSAus 60950 |
| EMC (module in cabinet) | IEC 62 040-2 Cat C1 and C3 |
| Protection class | IP 20 (indoor controlled conditions) |
| Environment | IEC 62093 (indoor controlled conditions) |
| Transport classification | UN 3480 - Class 9 |
| Transport regulation compliance | UN 3480 - ST/SG/AC 10/11 Rev 5 § 38 3 |
| Directives | RoHS, Reach WEEE |

The Synerion 24E module has been developed and qualified along IEC 61508/SIL2 standards to suit the demanding requirements of performance and operational reliability of our customers who are manufacturing or operating high-value long life equipment.

Manufacturing plants comply with the legislation in force in each country and with international quality and environment standards (ISO 9001,QS 9000,ISO 14000)

System capability
- Saft BMM included in any system configuration
- Series connection of up to 36 modules plus one BMM for string management and interfacing
- Multi-string paralleling up to 36 strings with Saft MBMM (Master Battery Management Module)

Functional characteristics
Saft energy storage module technology contains VLE cells with advanced nickel-based lithium-ion technology:
- Outstanding calendar and cycle life and reliability
- Stable internal resistance
- High energy density cells

Mechanical & electrical interface
- Vertical or horizontal implementation
- Stackable up to 8 modules
- Optional 3U rack-mount brackets
- Power connectors on the front panel
- Installation in dedicated cabinet or containers with adequate mechanical design and ventilation

FIG.3 (Cont'd)

"ECO-BANDS"  FIG. 4

| ECO Band # (Power Band) DEFAULT (D) | (KW) | ENGINE STATUS (ON/OFF) | | BATTERY BANK 1 | | BATTERY BANK 2 | |
|---|---|---|---|---|---|---|---|
| | | 1 X C27 | 1 X G3516B | Charge | Discharge | Charge | Discharge |
| ECO Band 1D (EB1D) | 0-50 | OFF | OFF | - | X | - | - |
| | 50-250 | ON | OFF | - | - | X | - |
| | 250-725 | ON | OFF | X | - | - | X |
| ECO Band 2D (EB2D) | 725-1300 | OFF | ON | X | - | X | - |
| | 1300-1500 | OFF | ON | - | X | - | - |
| ECO Band 3D (EB3D) | >1500 | ON | ON | X | - | - | X |

- Inactive
X Active

FIG. 5

| ECO Band # (Power Band) TRIPPING (T) | (KW) | ENGINE STATUS (ON/OFF) | | BATTERY BANK 1 | | BATTERY BANK 2 | |
|---|---|---|---|---|---|---|---|
| | | 1 X C27 | 1 X G3516B | Charge | Discharge | Charge | Discharge |
| ECO Band 1T (EB1T) | 250-575 | ON | OFF | X | - | - | X |
| ECO Band 2T (EB2T) | 575-1150 | OFF | ON | X | - | X | - |
| | 1150-1500 | OFF | ON | - | X | - | - |
| ECO Band 3T (EB3T) | >1500 | ON | ON | X | - | - | X |

• ALL BAND LIMITS ARE PRESET

Genset Engine Efficiency

| C27 Engine Efficiency | C27 Power Available (KW) | G3516B LNG Engine Efficiency | G3516B LNG Power Available (KW) |
|---|---|---|---|
| 100% | 725 | 100% | 1300 |
| 90% | 652 | 90% | 1040 |
| 80% | 580 | 80% | 1170 |
| 75% | 543 | 75% | 975 |
| 70% | 507 | 70% | 910 |
| 60% | 435 | 60% | 780 |
| 50% | 362 | 50% | 650 |
| 40% | 290 | 40% | 520 |
| 30% | 217 | 30% | 390 |
| 25% | 181 | 25% | 325 |
| 20% | 145 | 20% | 260 |

FIG. 6

BATTERY INTERFACE
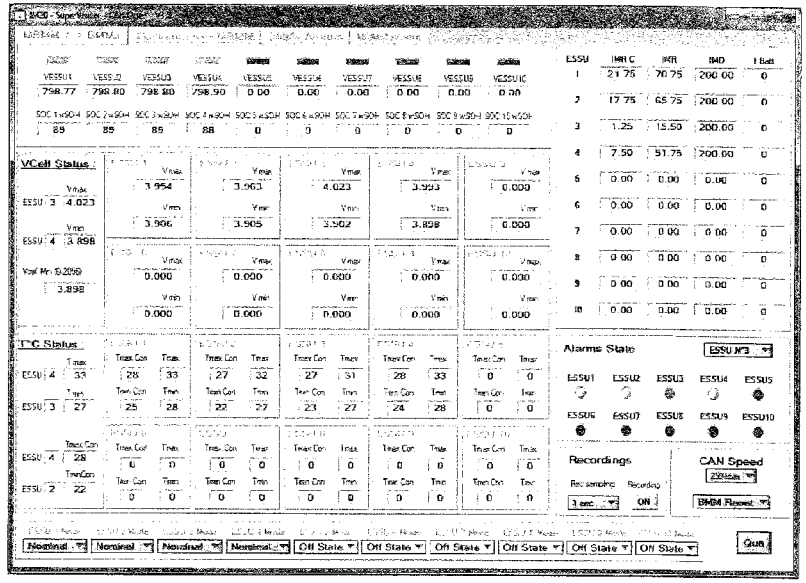
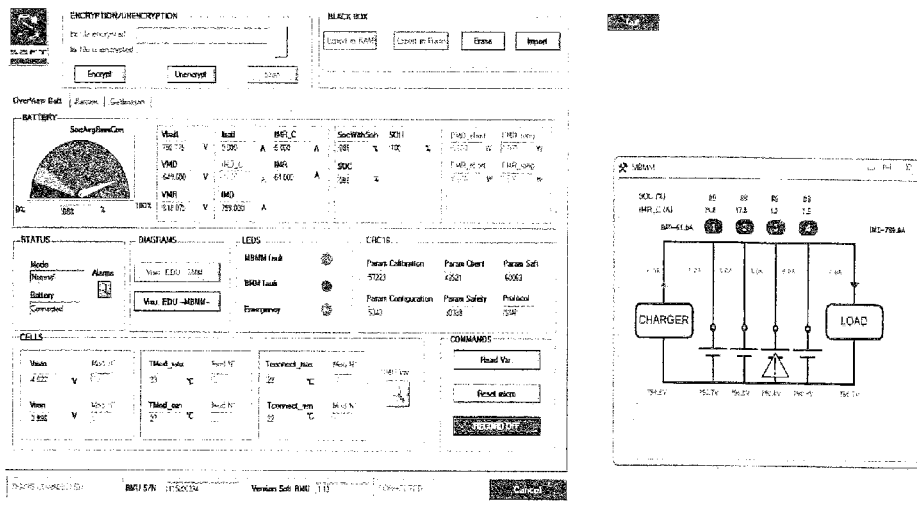
FIG. 15

METHOD AND SYSTEM FOR CONTROLLING A PORTABLE POWER SYSTEM

This application claims priority from U.S. Provisional Patent Application No. 61/826,449, filed May 22, 2013, and incorporated herein by reference.

FIELD OF THE INVENTION

This invention relates to the field of portable power systems, and more specifically, to a method and system for controlling a portable power system.

BACKGROUND

The production of electric power in emergencies or in remote locations is a common problem. A portable electric generator or portable power system may be used to produce electric power in emergencies or for delivering electric power to remote locations not served by the local electric utility.

One problem with existing portable power systems relates to the control of generator sets incorporated within them. In particular, while a generator set may be used efficiently to generate electric power for a stable demand, their efficiency drops for variable demands which are common in remote locations such as mines and drilling rig sites.

A need therefore exists for an improved method and system for controlling a portable power system. Accordingly, a solution that addresses, at least in part, the above and other shortcomings is desired.

SUMMARY OF THE INVENTION

According to one aspect of the invention, there is provided a method for controlling a portable power system, comprising: using a processor, selecting an engine efficiency range for a engine of a generator set of the portable power system, the engine efficiency range corresponding to a power output range of the generator set and to a power demand of a load coupled to the portable power system; when the power demand of the load is less than the power output of the generator set, storing excess power from the generator set in a first battery bank of the portable power system; when the power demand of the load is greater than the power output of the generator set, providing additional power to the load from a second battery bank of the portable power system; and, when at least one of a predetermined depth of discharge threshold is reached by the second battery bank and a predetermined state of charge threshold is reached by the first battery bank, switching between the second battery bank and the first battery bank.

In accordance with further aspects of the invention, there is provided an apparatus such as a data processing system, a control system, etc., a method for adapting same, as well as articles of manufacture such as a computer readable medium or product and computer program product or software product (e.g., comprising a non-transitory medium) having program instructions recorded thereon for practising the method of the invention.

BRIEF DESCRIPTION OF THE DRAWINGS

Features and advantages of the embodiments of the present invention will become apparent from the following detailed description, taken in combination with the appended drawings, in which:

FIG. 4 is a table listing default (drilling) operating states in accordance with an embodiment of the invention;

FIG. 5 is a table listing tripping operating states in accordance with an embodiment of the invention;

FIG. 6 is a table listing generator set engine efficiencies and power availabilities in accordance with an embodiment of the invention;

FIG. 15 are screen captures illustrating various example battery bank monitoring screens in accordance with an embodiment of the invention;

It will be noted that throughout the appended drawings, like features are identified by like reference numerals.

DETAILED DESCRIPTION OF THE EMBODIMENTS

In the following description, details are set forth to provide an understanding of the invention. In some instances, certain software, circuits, structures, techniques and methods have not been described or shown in detail in order not to obscure the invention. The term "data processing system" is used herein to refer to any machine for processing data, including the computer systems, control systems, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention. Aspects of the present invention may also be implemented in hardware or in a combination of hardware and software.

Figure 1:
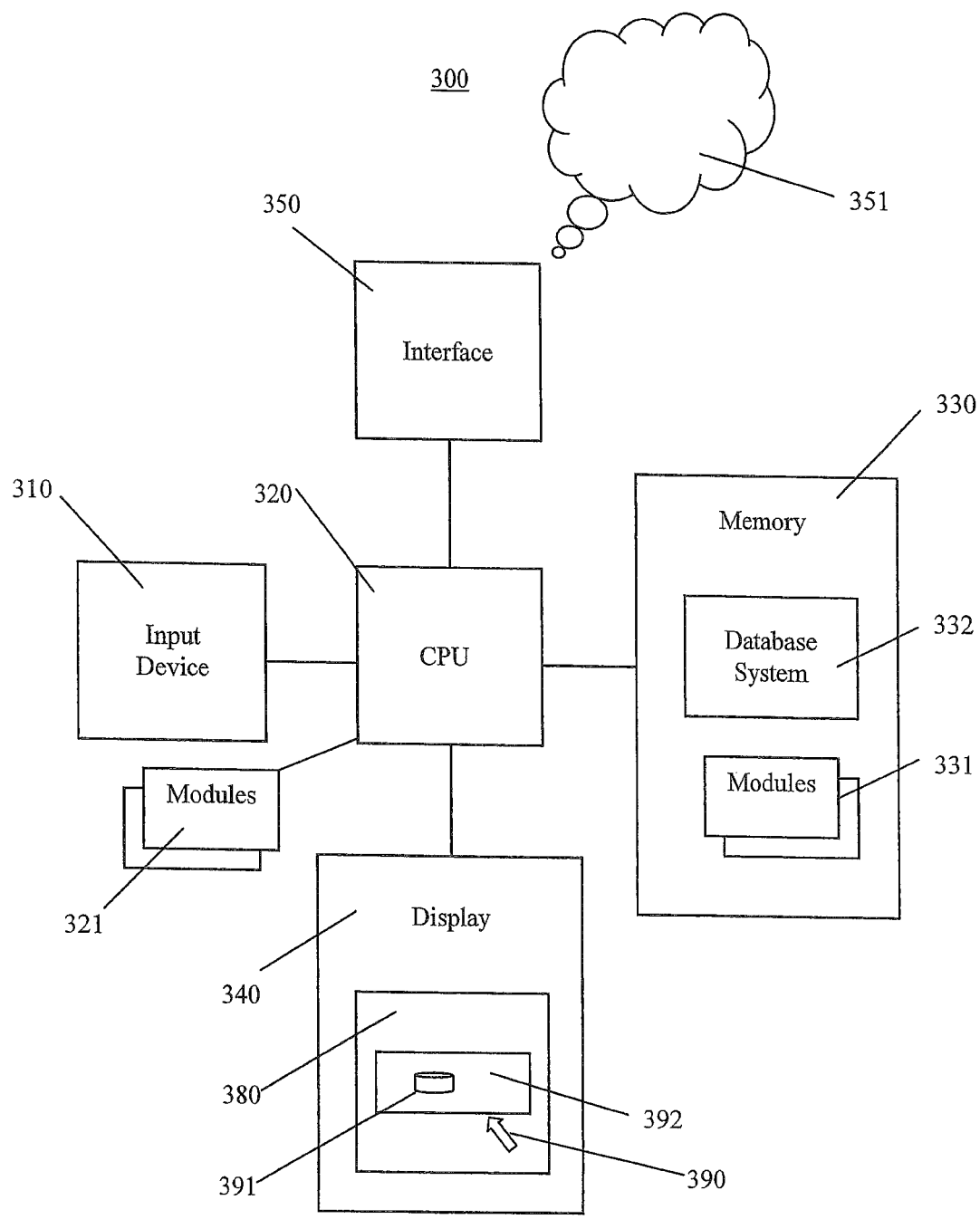
FIG. 1 is a block diagram illustrating a data processing system in accordance with an embodiment of the invention.

FIG. 1 is a block diagram illustrating a data processing system 300 in accordance with an embodiment of the invention. The data processing system 300 is suitable for controlling a portable power system 100 and for performing as a control system, programmable logic controller ("PLC"), or supervisory control and data acquisition ("SCADA")

system. The data processing system 300 is also suitable for generating, displaying, and adjusting presentations in conjunction with a graphical user interface ("GUI") or Operator Interface Terminal ("OIT"), as described below. The data processing system 300 may be a client and/or server in a client/server system. For example, the data processing system 300 may be a server system or a personal computer ("PC") system. The data processing system 300 may also be a wireless device or other mobile, portable, or handheld device. The data processing system 300 includes an input device 310, a central processing unit ("CPU") or processor 320, memory 330, a display 340, and an interface device 350. The input device 310 may include a keyboard, a mouse, a trackball, a touch sensitive surface or screen, a position tracking device, an eye tracking device, or a similar device. The display 340 may include a computer screen, television screen, display screen, terminal device, a touch sensitive display surface or screen, or a hardcopy producing output device such as a printer or plotter. The memory 330 may include a variety of storage devices including internal memory and external mass storage typically arranged in a hierarchy of storage as understood by those skilled in the art. For example, the memory 330 may include databases, random access memory ("RAM"), read-only memory ("ROM"), flash memory, and/or disk devices. The interface device 350 may include one or more network connections. The data processing system 300 may be adapted for communicating with other data processing systems (e.g., similar to data processing system 300) over a network 351 via the interface device 350. For example, the interface device 350 may include an interface to a network 351 such as the Internet and/or another wired or wireless network (e.g., a wireless local area network ("WLAN"), a cellular telephone network, etc.). As such, the interface 350 may include suitable transmitters, receivers, antennae, etc. In addition, the data processing system 300 may include a Global Positioning System ("GPS") receiver. Thus, the data processing system 300 may be linked to other data processing systems by the network 351. The CPU 320 may include or be operatively coupled to dedicated coprocessors, memory devices, or other hardware modules 321. The CPU 320 is operatively coupled to the memory 330 which stores an operating system (e.g., 331) for general management of the system 300. The CPU 320 is operatively coupled to the input device 310 for receiving user commands or queries and for displaying the results of these commands or queries to the user on the display 340. Commands and queries may also be received via the interface device 350 and results may be transmitted via the interface device 350. The data processing system 300 may include a data store or database system 332 for storing data and programming information. The database system 332 may include a database management system (e.g., 332) and a database (e.g., 332) and may be stored in the memory 330 of the data processing system 300. In general, the data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules 321 or software modules 331 resident in the memory 330 of the data processing system 300 or elsewhere (e.g., 320). Alternatively, the programmed instructions may be embodied on a computer readable medium or product (e.g., a memory stick, a compact disk ("CD"), etc.) which may be used for transporting the programmed instructions to the memory 330 of the data processing system 300. Alternatively, the programmed instructions may be embedded in a computer-readable signal or signal-bearing medium or product that is uploaded to a network 351 by a vendor or supplier of the programmed instructions, and this signal or signal-bearing medium may be downloaded through an interface (e.g., 350) to the data processing system 300 from the network 351 by end users or potential buyers.

A user may interact with the data processing system 300 and its hardware and software modules 321, 331 using a user interface such as a graphical user interface ("GUI") or Operator Interface Terminal ("OIT") 380 (and related modules 321, 331). The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input device 310 such as a mouse. In general, a GUI is used to convey information to and receive commands from users and generally includes a variety of GUI objects or controls, including icons, toolbars, dropdown menus, text, dialog boxes, buttons, and the like. A user typically interacts with a GUI 380 presented on a display 340 by using an input device (e.g., a mouse) 310 to position a pointer or cursor 390 over an object (e.g., an icon) 391 and by "clicking" on the object 391. Typically, a GUI based system presents application, system status, and other information to the user in one or more "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 2:
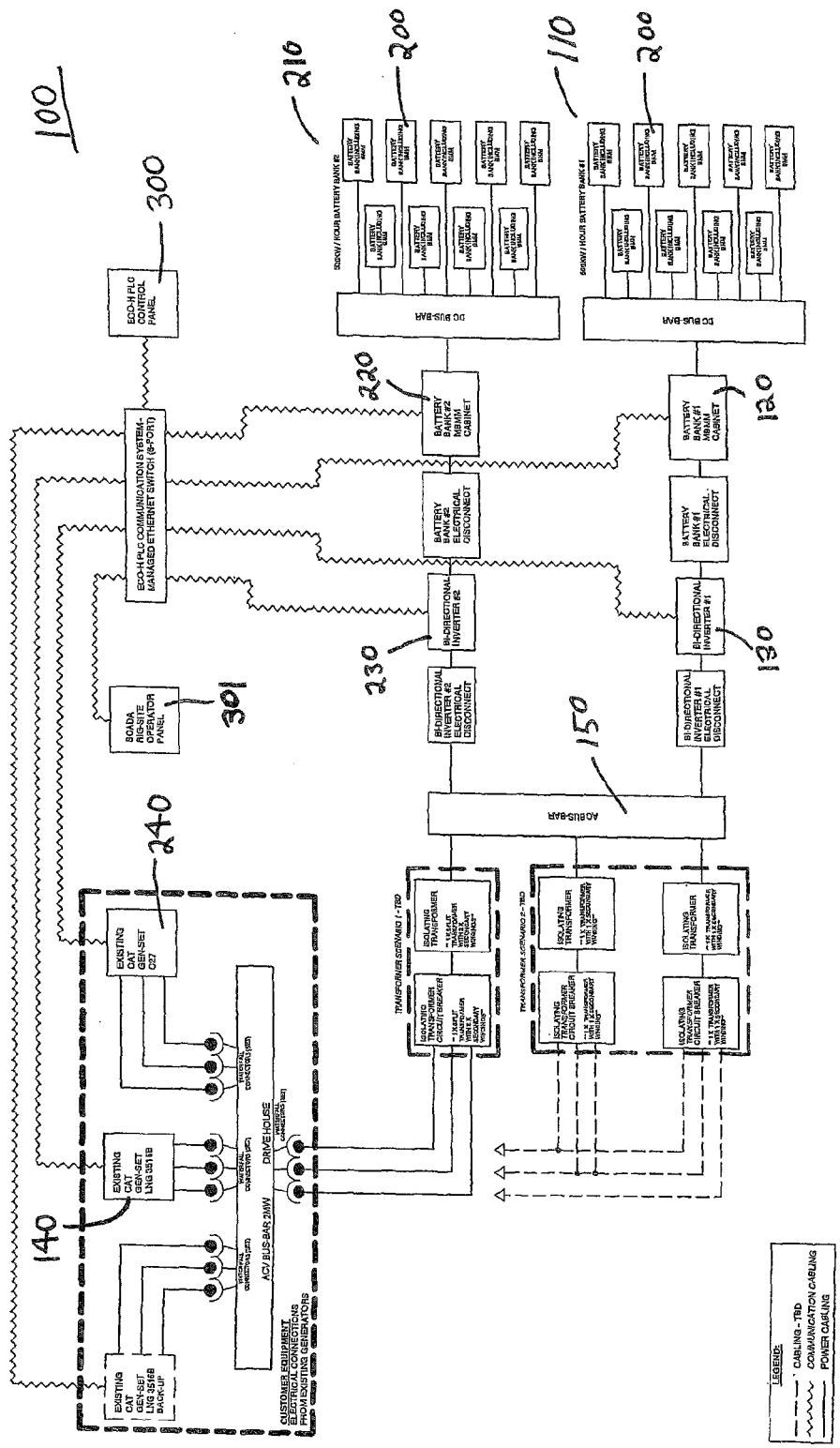
FIG. 2 is a block diagram illustrating a portable power system in accordance with an embodiment of the invention.
Figure 2:
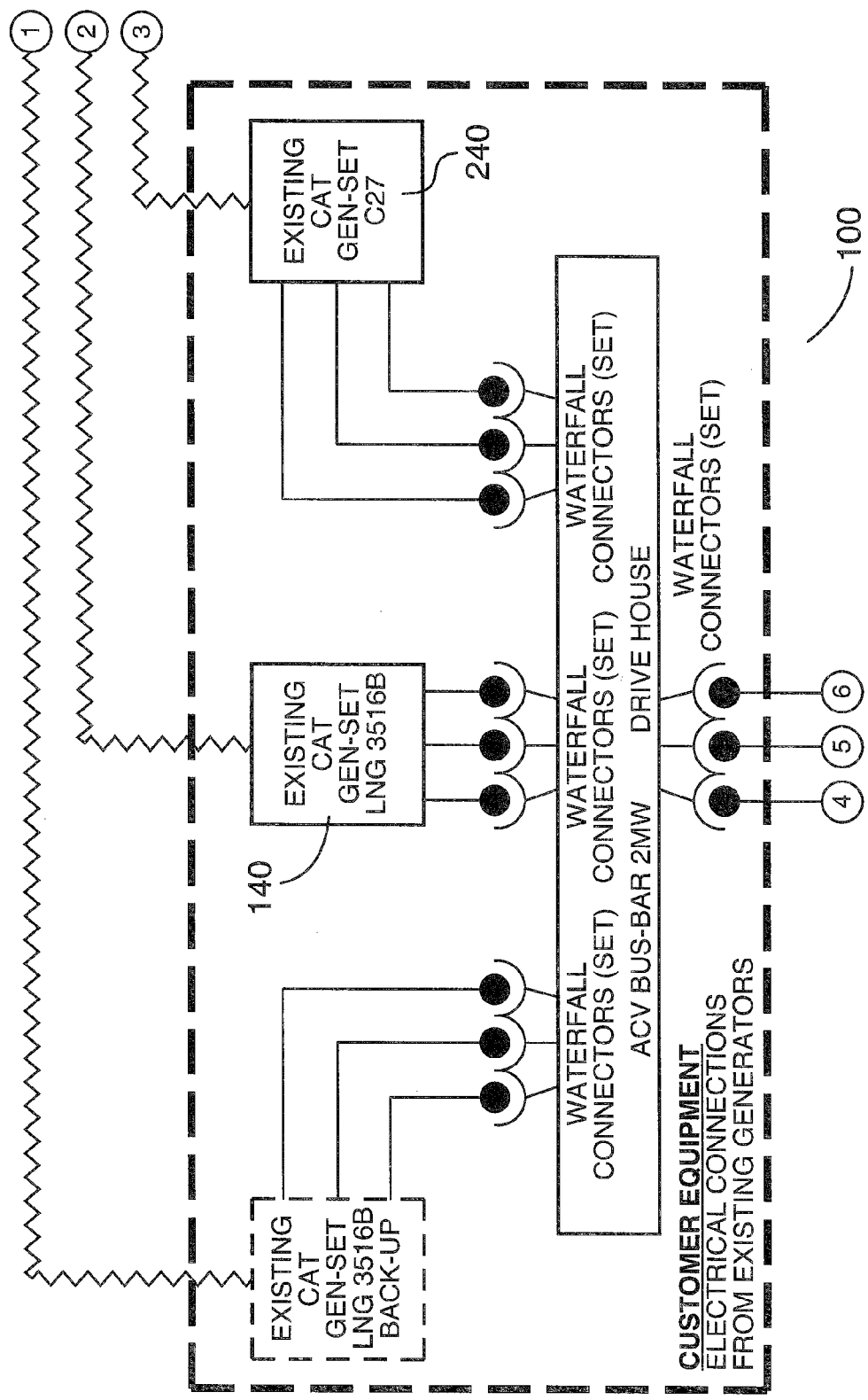
Figure 2:
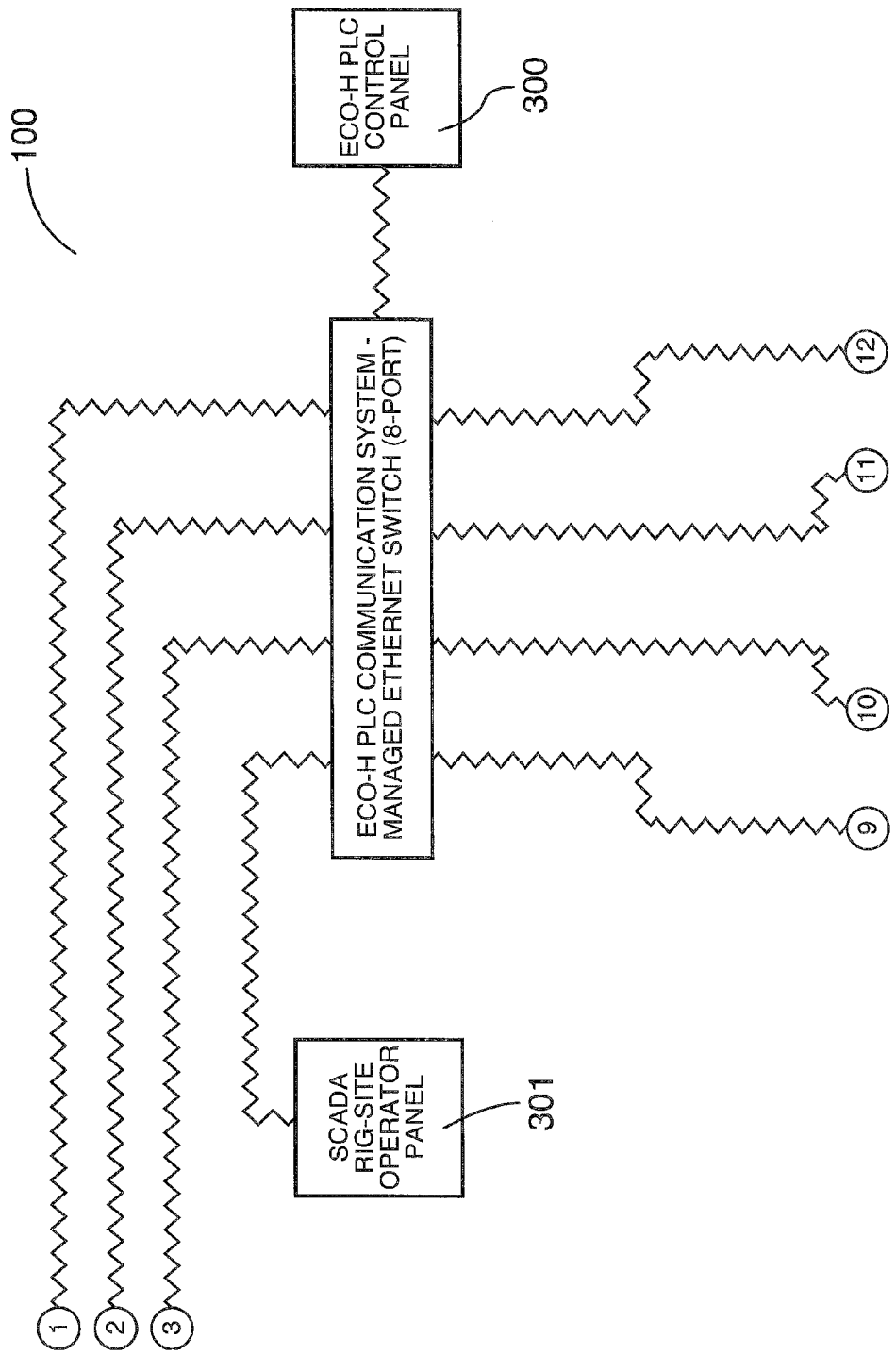
Figure 2:
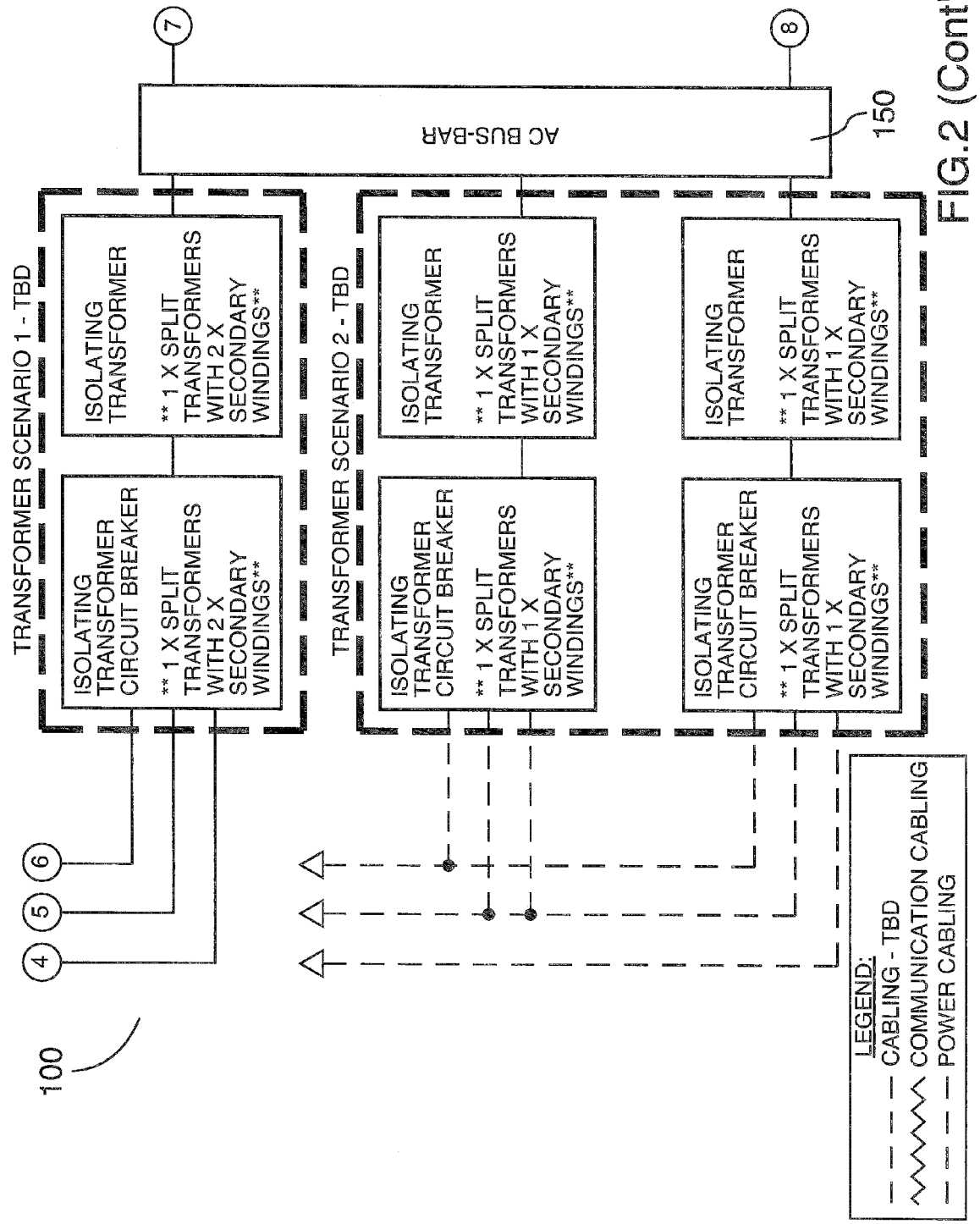
Figure 2:
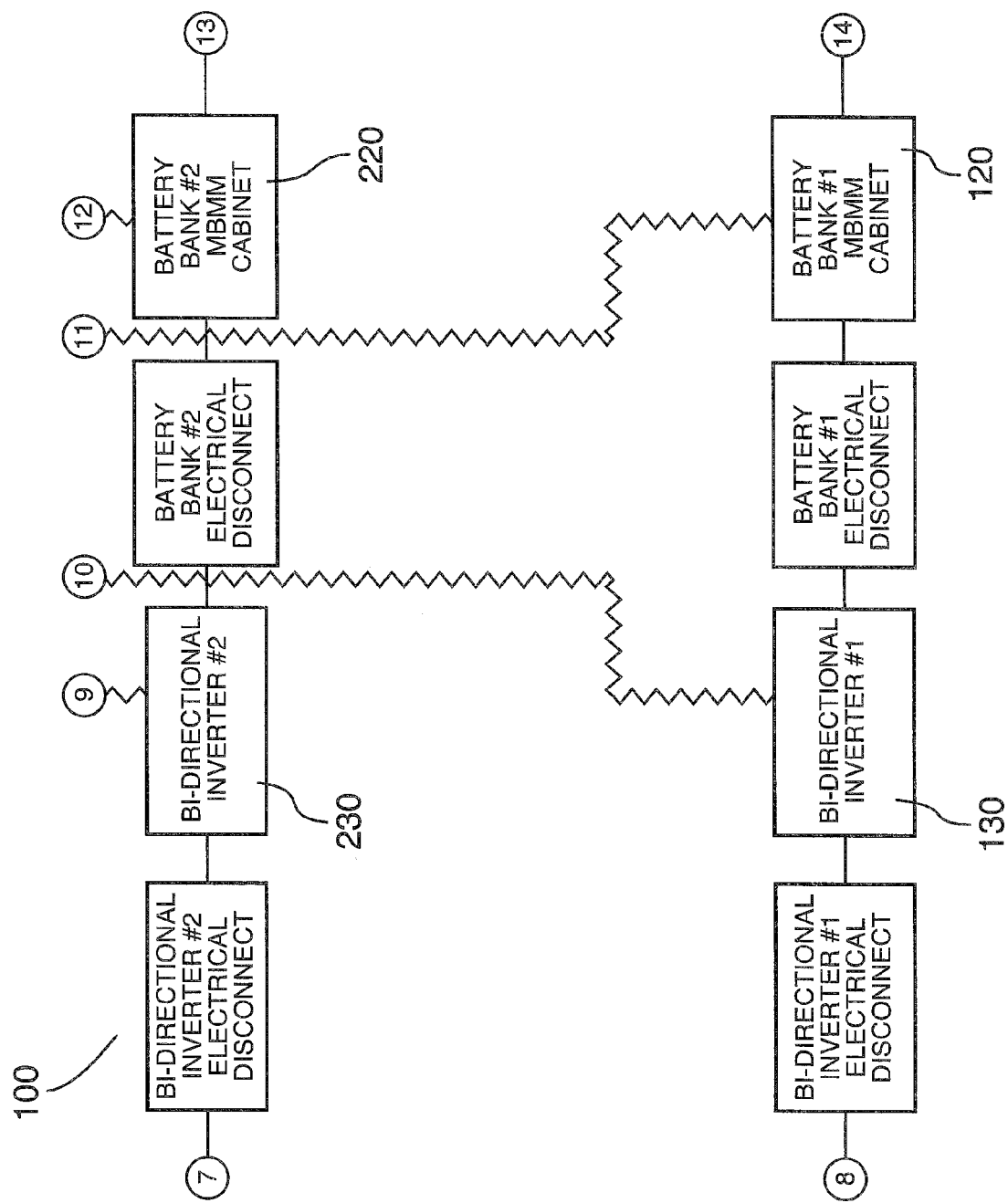
Figure 2:
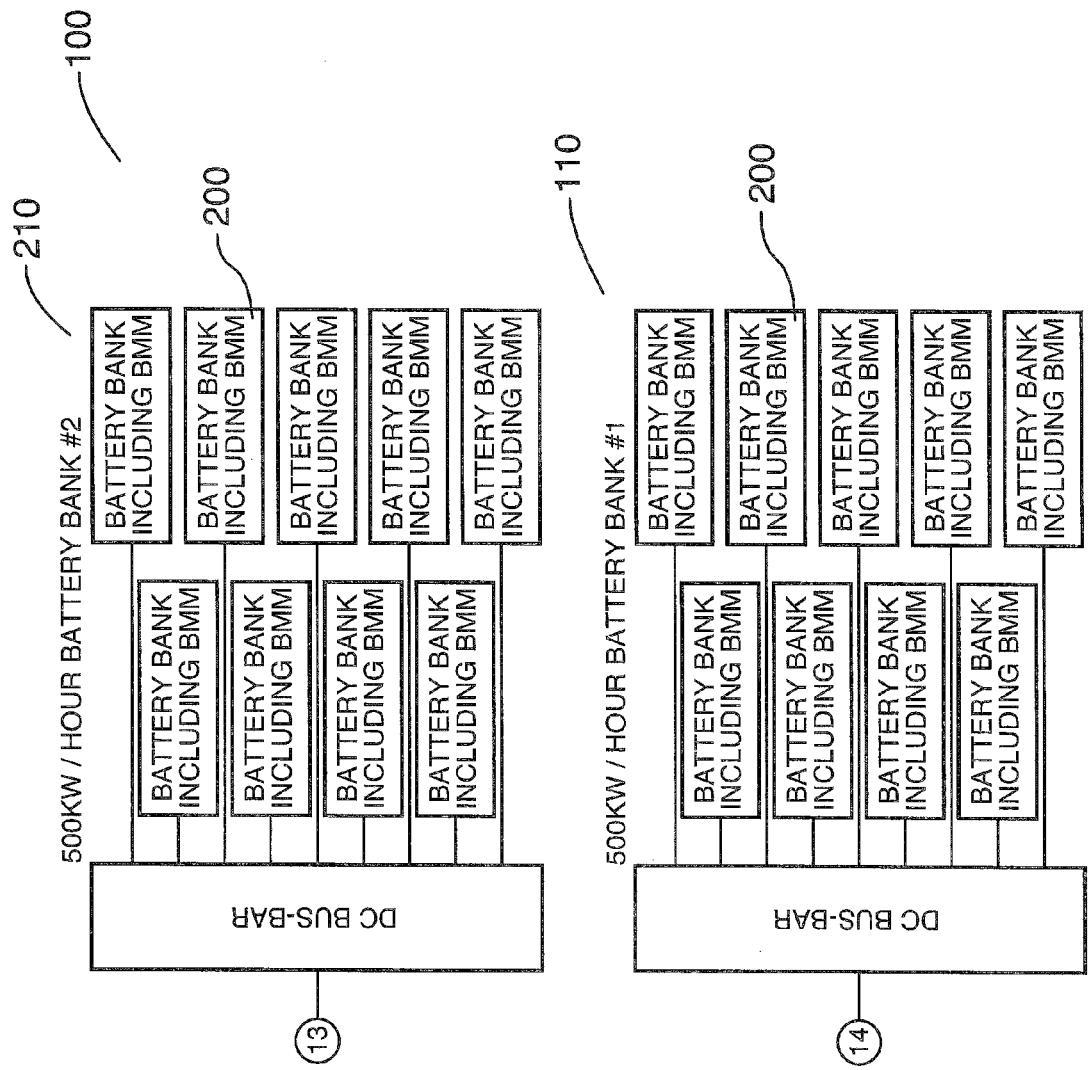

FIG. 2 is a block diagram illustrating a portable power system 100 in accordance with an embodiment of the invention. The portable power system 100 includes a first battery bank 110 coupled to a first master battery management module ("MBMM") 120 which is in turn coupled to a first inverter 130 for providing alternating current ("AC") power to an AC bus 150 coupled thereto. A second battery bank 210 coupled to a second MBMM 220 which is in turn coupled to a second inverter 230 for providing AC power is also coupled to the AC bus 150. In addition, the portable power system 100 includes a first generator set ("genset") 140 and a second generator set 240 which are also coupled to the AC bus 150. Operation of the gensets 140, 240, MBMMs 120, 220, and inverters 130, 230 is controlled and monitored by the data processing system or control system 300.

According to one embodiment, if AC power is not required, DC power may be provided by the portable power system 100.

The portable power system 100 functions to provide and/or store energy through the use of battery banks 110, 220 and gensets 140, 240 with a high level of energy security through a mix of power generation methods. The system 100 uses two battery management systems capable of alternating between providing and storing energy. The data processing system or control system 300 regulates the gensets 140, 240, which may be installed at a remote location such as a drilling rig site, within predetermined operating states or "Eco-Bands" allowing for optimized efficiency for almost any condition through adjustment of the depth of discharge ("DOD") and the state of charge ("SOC") of the battery banks 110, 210. The term "Eco-Bands" is used herein to refer to ranges of engine operating speeds under which the gensets 140, 240 operate at maximum efficiency (e.g., 610) and related predetermined operating states (e.g., 410).

The portable power system 100 may be a containerized system mounted on a single skid or trailer to facilitate mobility. According to one embodiment, the gensets 140, 240 are included with the containerized system 100. According to another embodiment, the gensets 140, 240 may be existing at a drilling rig site or other remote location.

Figure 3:
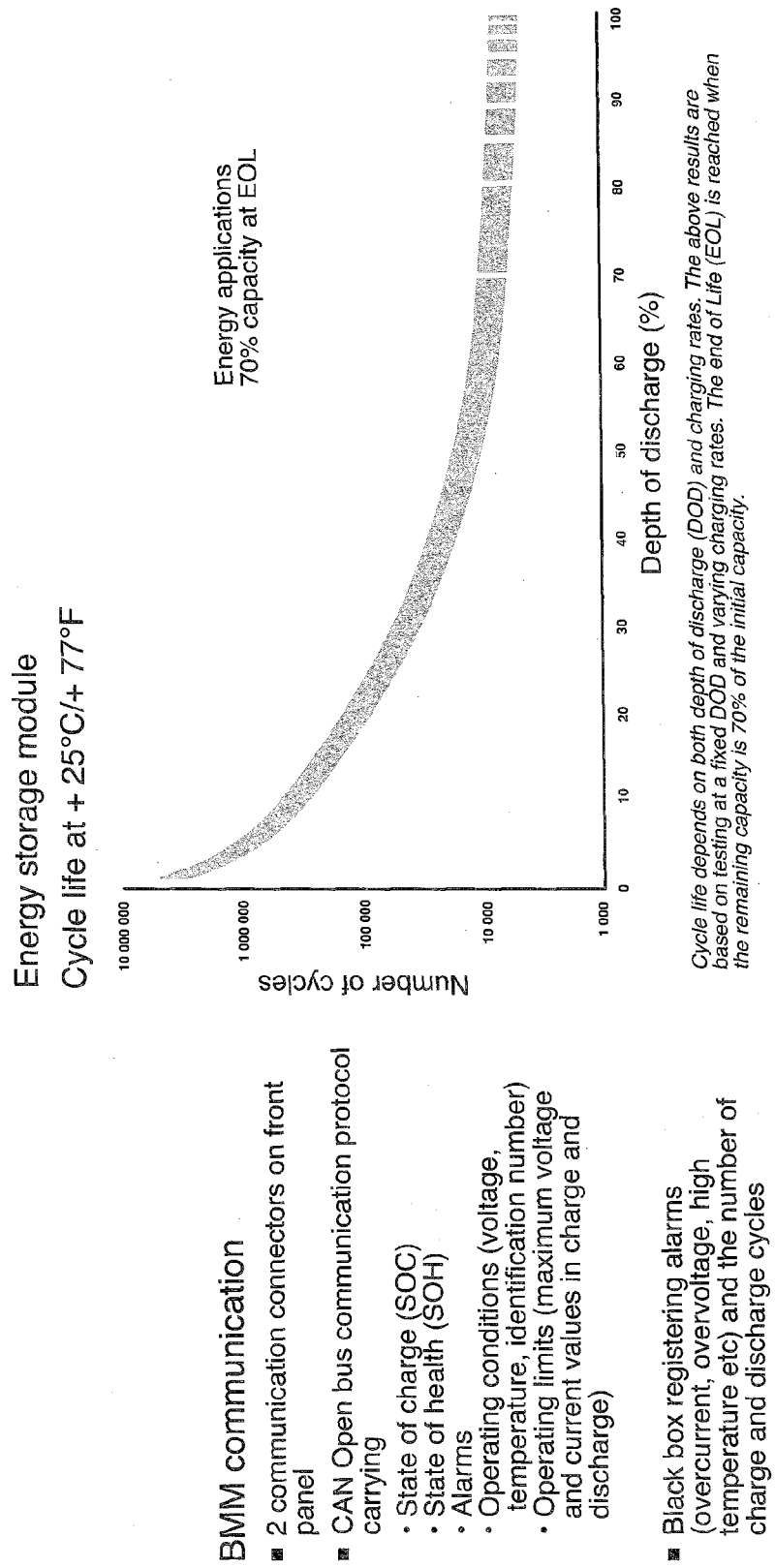
FIG. 3 is a front perspective view illustrating a lithium-ion battery bank module in accordance with an embodiment of the invention.

FIG. 3 is a front perspective view illustrating a lithium-ion battery bank module 200 in accordance with an embodiment of the invention. According to one embodiment, the batteries or battery banks 110, 210 may be lithium-ion batteries. Note that battery life (in terms of charge-discharge cycles) is extended for lithium-ion batteries if deep discharges (i.e., SOC less than 50%) are avoided. This characteristic of lithium-ions batteries is taken into account in the method of operation of the portable power system 100 described herein. The battery banks 110, 210 may include multiple lithium-ion battery bank modules 200.

Retrofitting an existing drilling rig site with the system 100 provides the site's existing liquid natural gas ("LNG") and/or diesel gensets 140, 240 with improved fuel savings and reduced emissions. The system 100 may connect directly to the drilling rig site's existing AC bus 150 and SCADA system 301 with minimal adaption and downtime (i.e., "plug and play" start-up is facilitated).

The system 300 includes control algorithms or modules 331 to regulate the LNG and/or diesel gensets 140, 240 to operate at up to 40-60% higher efficiency, as compared to conventional drilling rig sites, by stabilizing the gensets' engine fluctuations through the use of predetermined operating states and ranges (or Eco-Bands) 410.

FIG. 4 is a table listing default (drilling) operating states 410 in accordance with an embodiment of the invention, And, FIG. 5 is a table listing tripping operating states in accordance with an embodiment of the invention. When drilling rig site projecting is available, the system 100 permits the rig operator to select one of the following two modes (or "Eco-Modes"): A. Default (drilling) ("D"); and, B. Tripping ("T"). This allows for operator control over the available power and demand for these two specific operating conditions or modes. Operating states and ranges (or Eco-Bands) 410 for the default and tripping modes are listed in FIGS. 4 and 5, respectively.

FIG. 6 is a table listing generator set engine efficiencies and power availabilities in accordance with an embodiment of the invention. According to one embodiment, the two gensets 140, 240 have differently rated engines. For example, the first genset 140 may include a larger CAT™ G3516B engine while the second genset 240 may include a smaller CAT™ C27 engine. The genset engine efficiencies and power availabilities for the engines or each of these two gensets 140, 240 are listed in FIG. 6.

Figure 7:
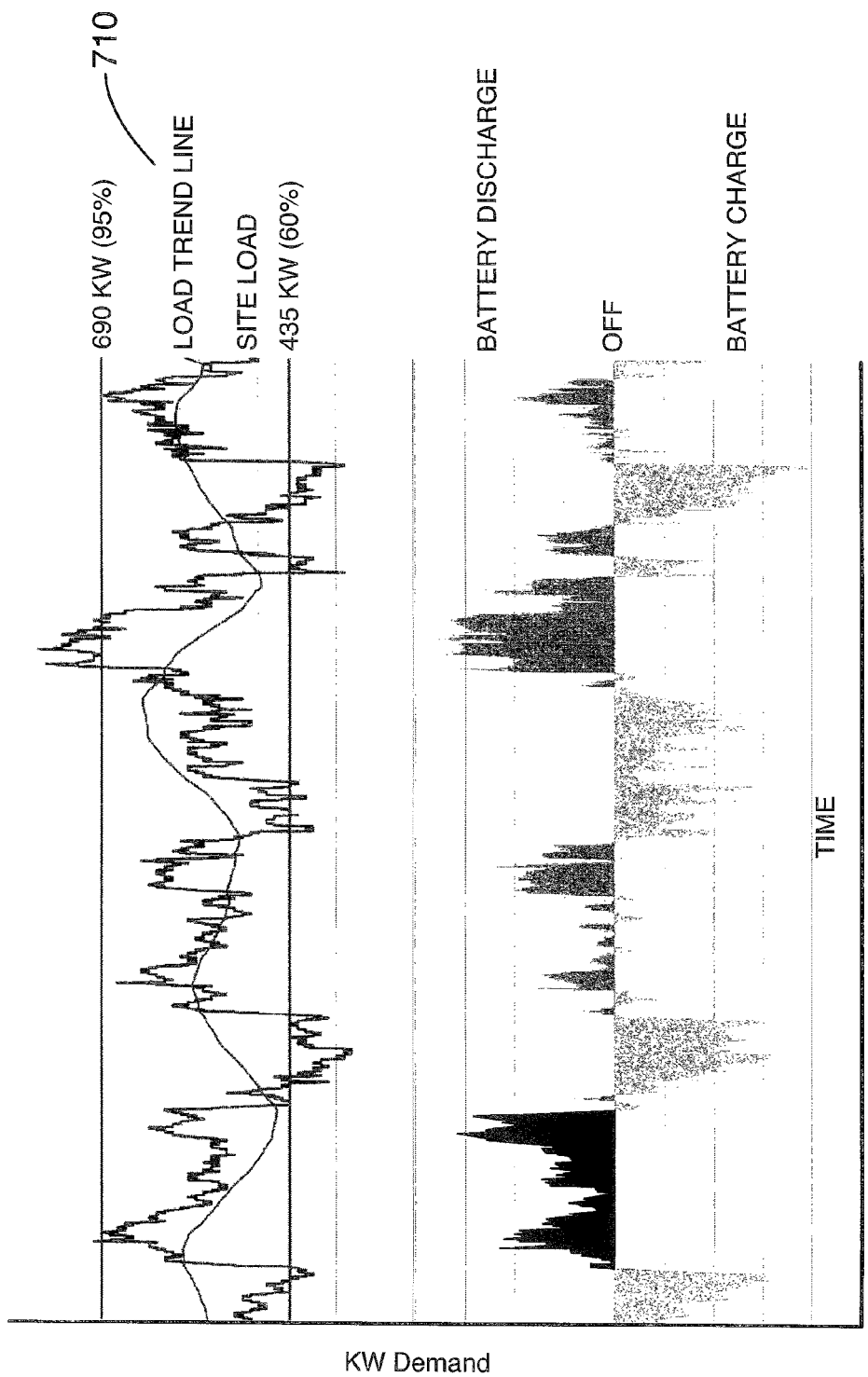
FIG. 7 is a graph illustrating power demand versus time for an example default (drilling) scenario in accordance with an embodiment of the invention.
Figure 8:
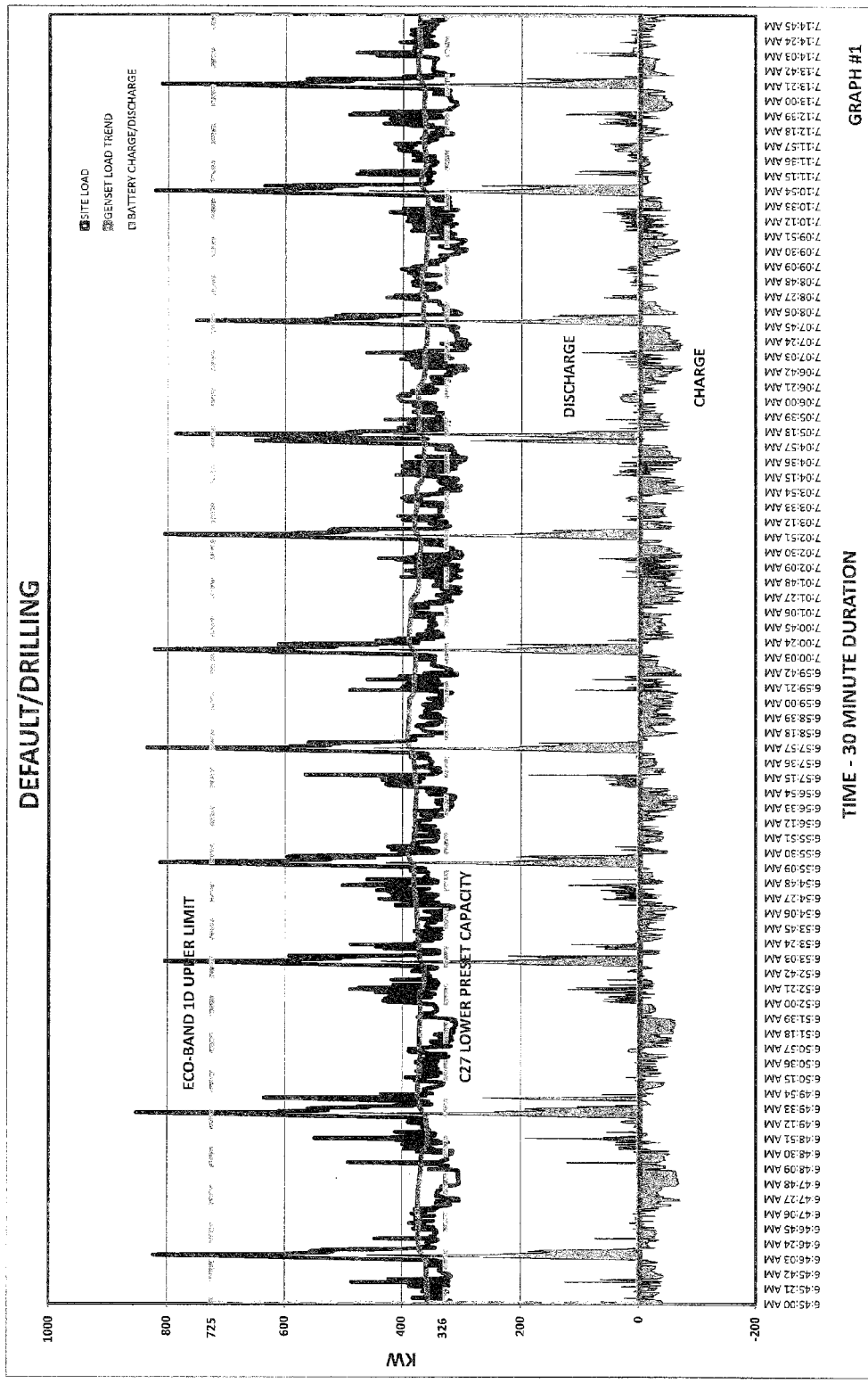
FIGS. 8-12 are graphs illustrating power demand versus time for example time durations and operating states in accordance with an embodiment of the invention.
Figure 9:
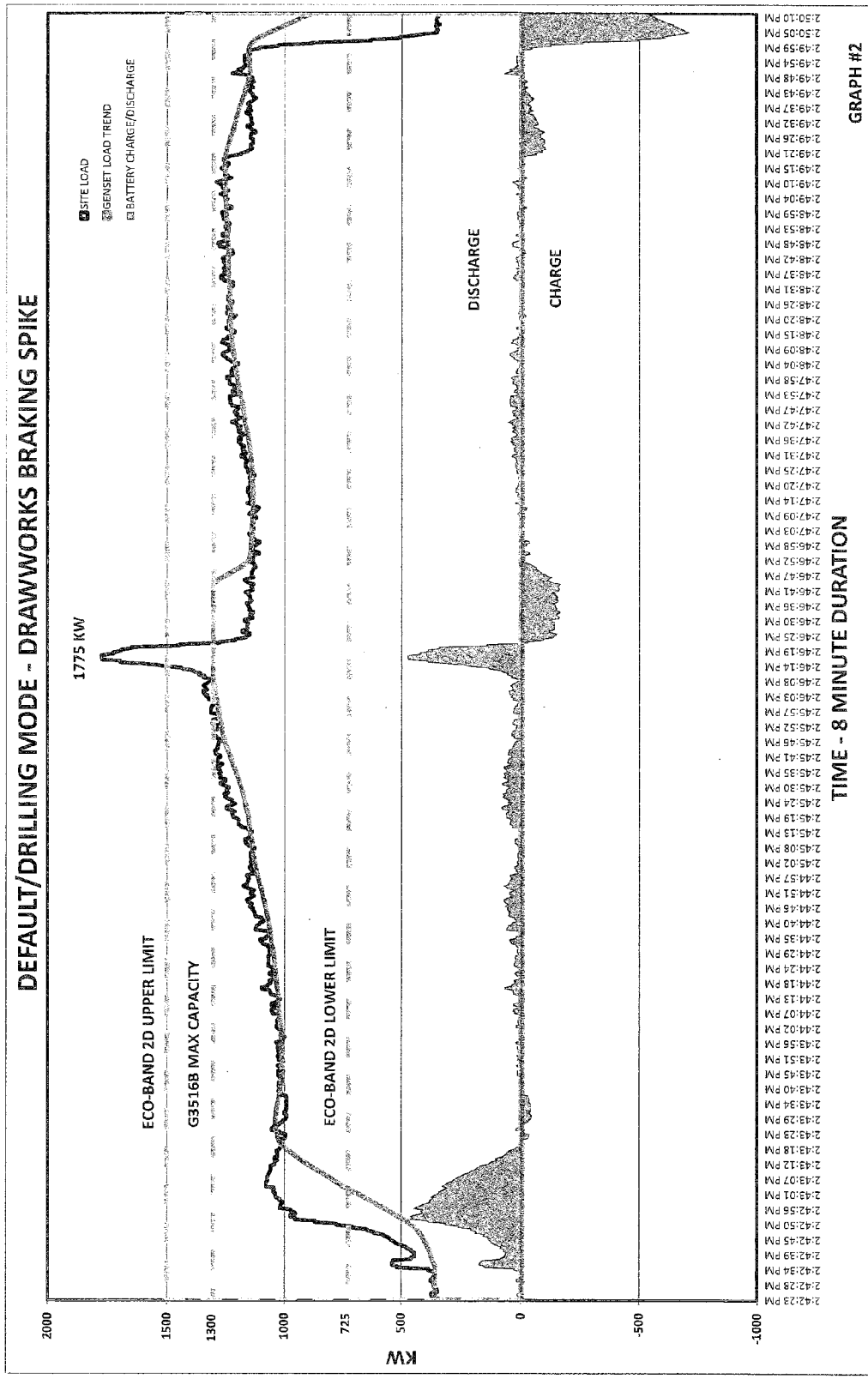
Figure 10:
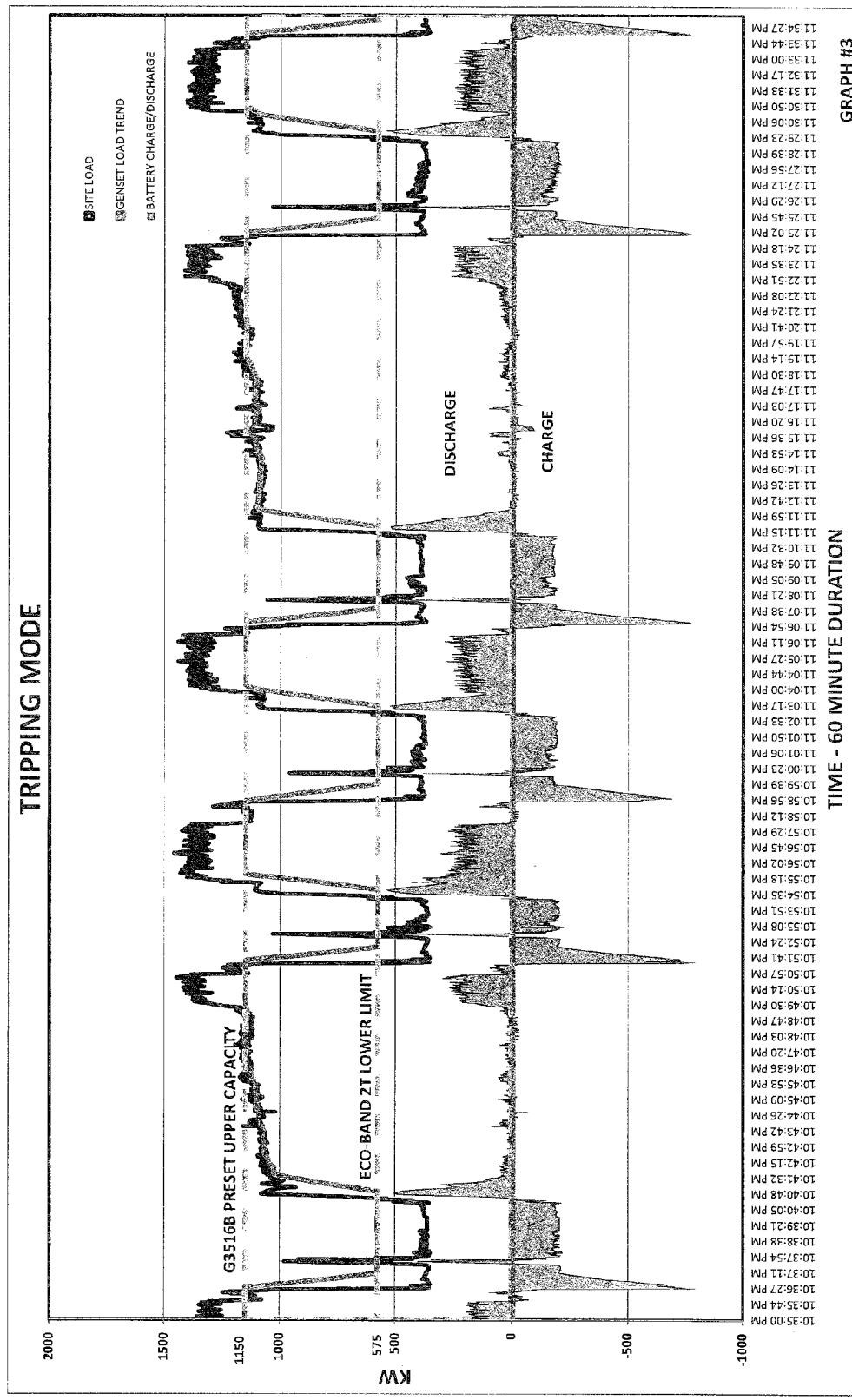
Figure 11:
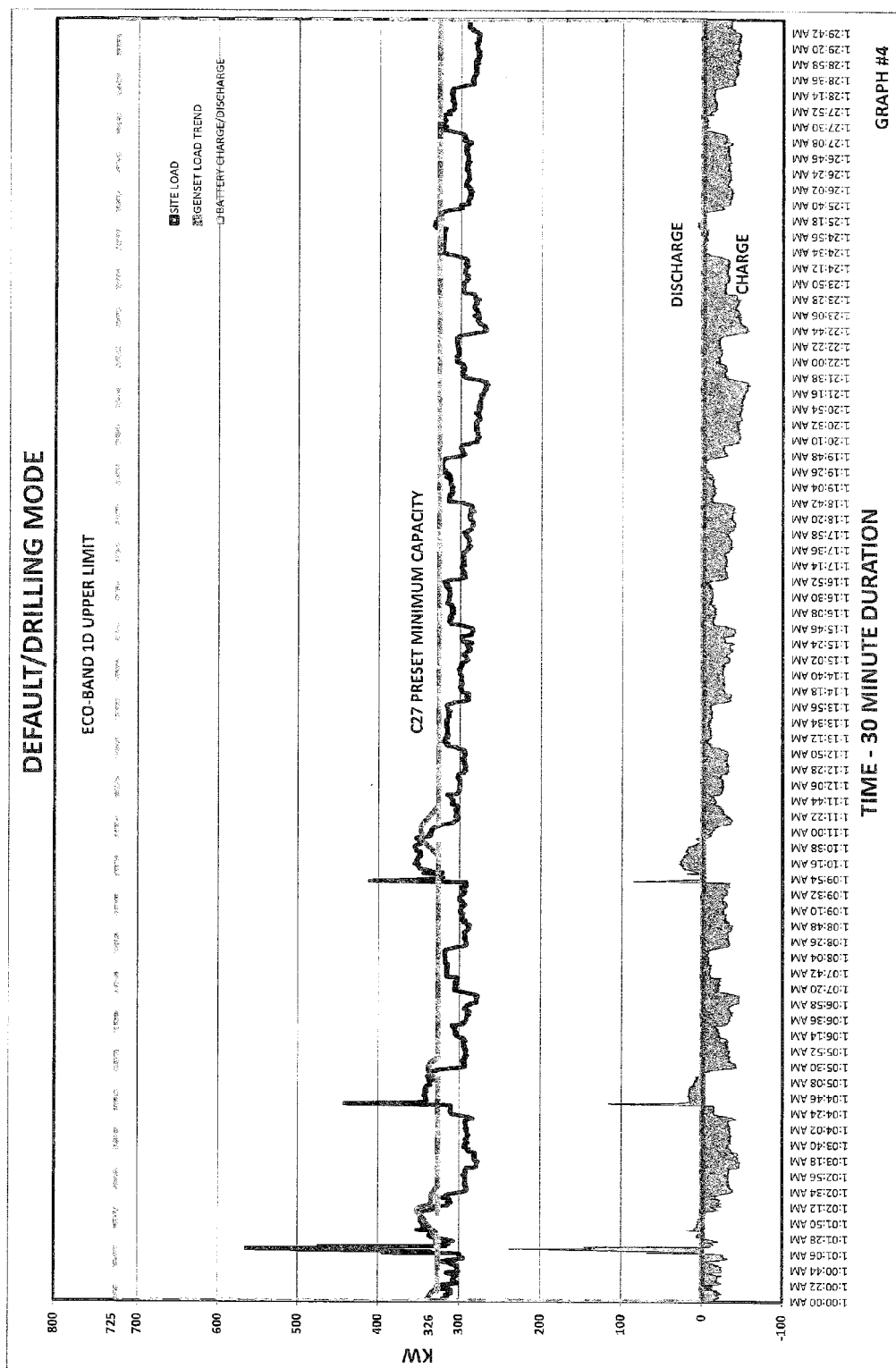
Figure 12:
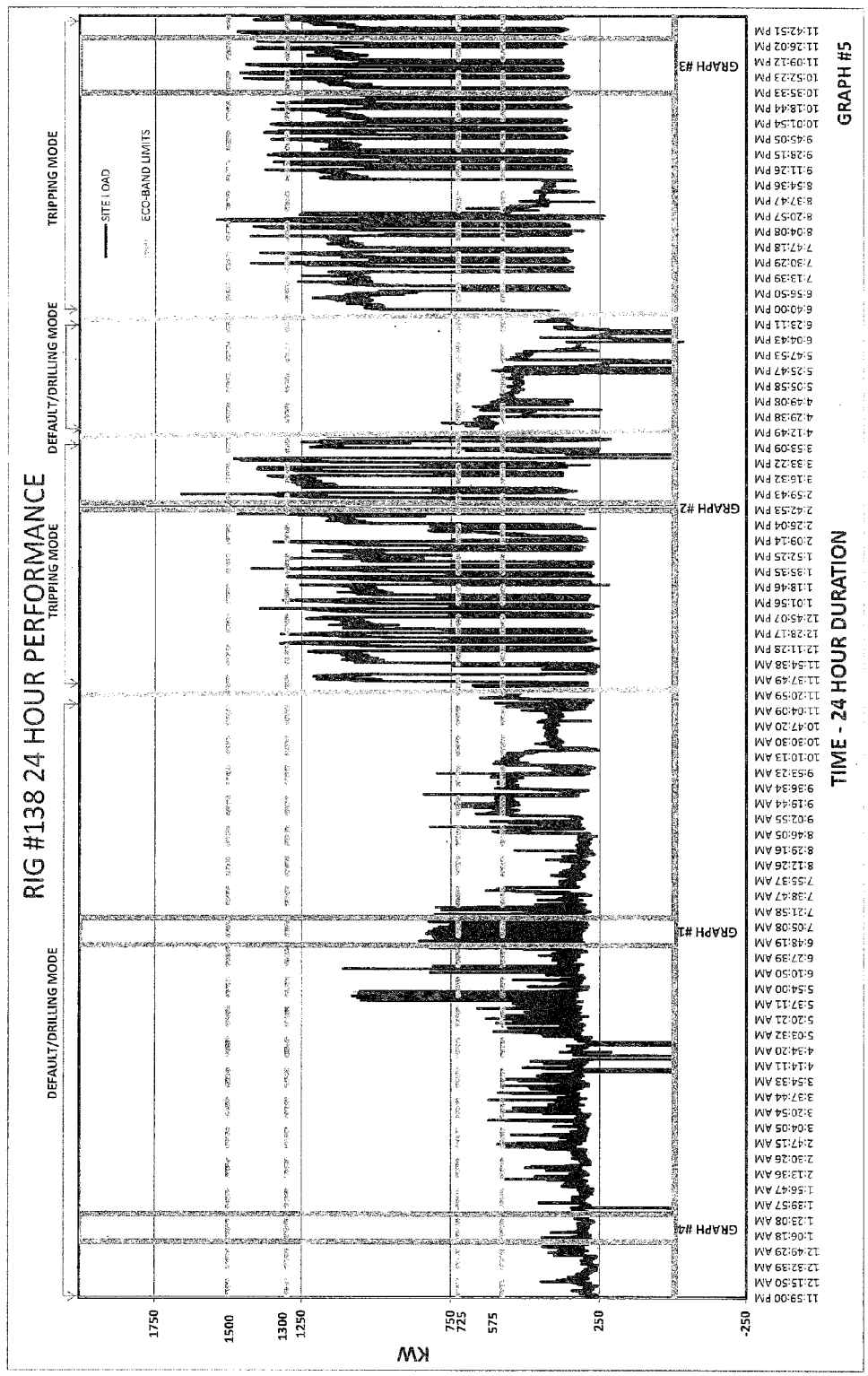

FIG. 7 is a graph illustrating power demand versus time for an example default (drilling) scenario in accordance with an embodiment of the invention. The general steps included in the operation of the portable power system 100 may be described with reference to FIG. 6, FIG. 7, and Eco-Band 1D ("EB1D") 410 in FIG. 4 as follows.

At step (a), the engine efficiency range (e.g., 610) for the engine of the C27 genset 240 is set to 60% to 95% for a drilling rig site demand or load of between 435 kW and 690 kW. See FIGS. 6 and 7.

At step (b), both battery banks 110, 120 are at 25% depth of discharge ("DOD") (75% state of charge ("SOC")) and the C27 genset 240 is running at optimal efficiency (following the load trend line 710 shown in FIG. 7).

At step (c), when the load is greater than the output of the C27 genset 240, the system 100 will supplement the output of the C27 genset 240 with additional energy from the second battery bank ("B2") 210. See EB1D 410 in FIG. 4.

At step (d), conversely, if the load drops to less than the output of the C27 genset 240, the system 100 will divert excess energy to the first battery bank ("B1") 110. See EB1D 410 in FIG. 4.

At step (e), operations continue until a 50% DOD in B2 210 and/or a 100% SOC in the B1 110 is reached.

At step (f), at this time, the system 100 will reverse the function of B1 110 and B2 210.

At step (g), the above cycle or method is repeated as required.

FIGS. 8-12 are graphs illustrating power demand versus time for example time durations and operating states (or Eco-Bands) 410 in accordance with an embodiment of the invention.

With respect to user management and control of the system 100, a number of input and reporting screens are provided for presentation to a user on a display 340 of the system 100. These screens are described in the following.

Figure 13:
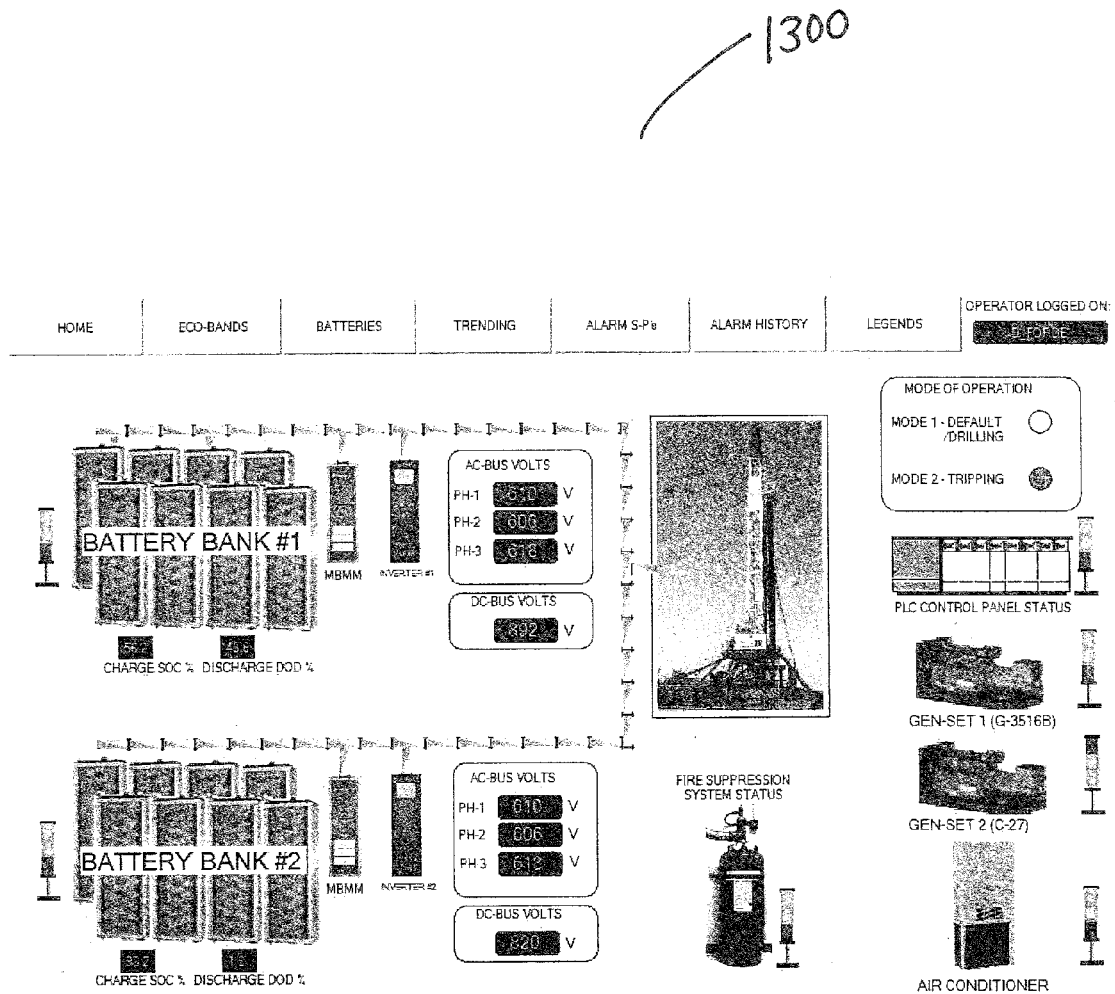
FIG. 13 is a screen capture illustrating an example system overview screen in accordance with an embodiment of the invention.

FIG. 13 is a screen capture illustrating an example system 100 overview screen 1300 in accordance with an embodiment of the invention.

Figure 14:
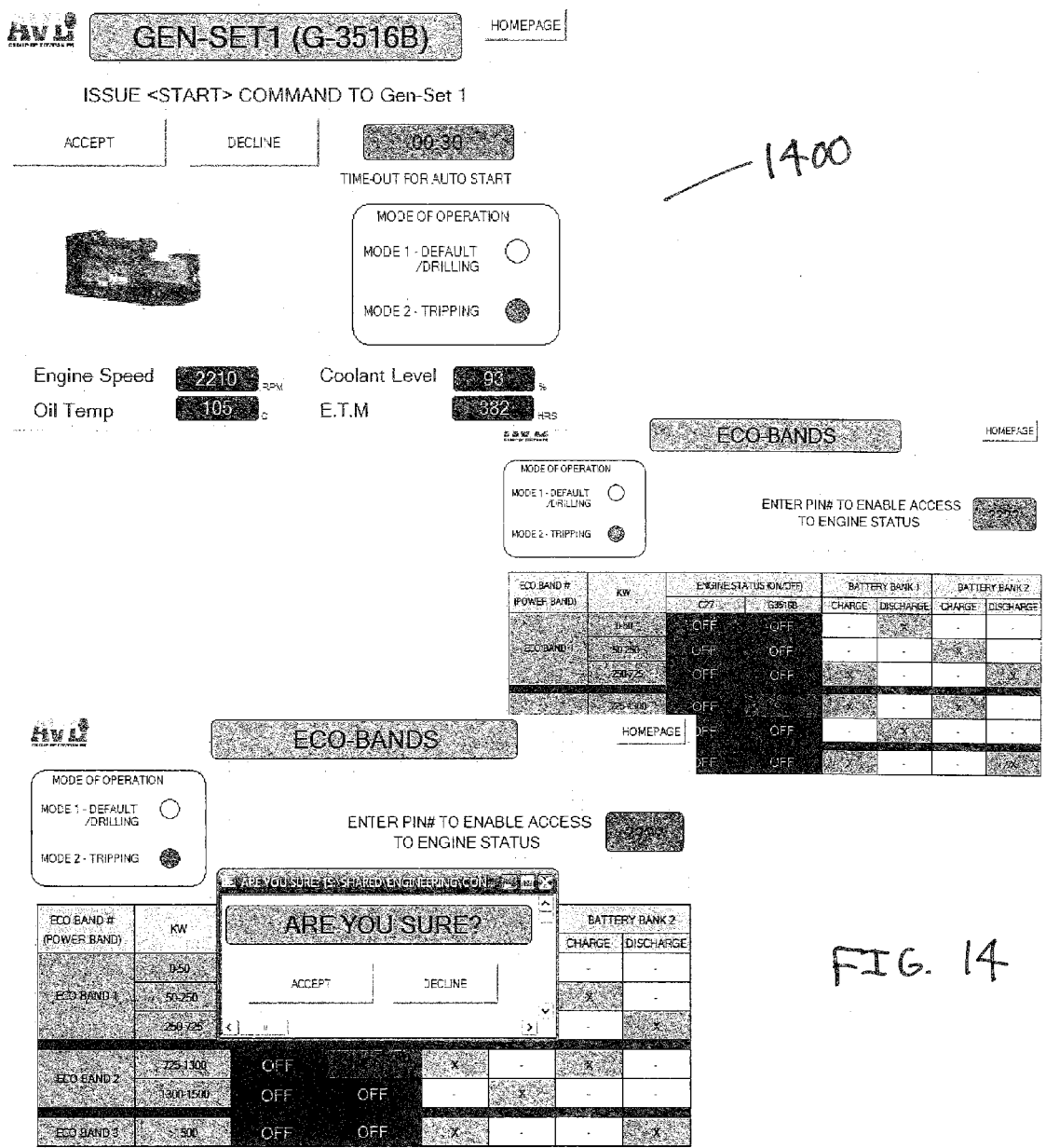
FIG. 14 are screen captures illustrating various example generator set control screens in accordance with an embodiment of the invention.

FIG. 14 are screen captures illustrating various example generator set 140, 240 control screens 1400 in accordance with an embodiment of the invention.

FIG. 15 are screen captures illustrating various example battery bank 110, 210 monitoring screens 1500 in accordance with an embodiment of the invention.

Figure 16:
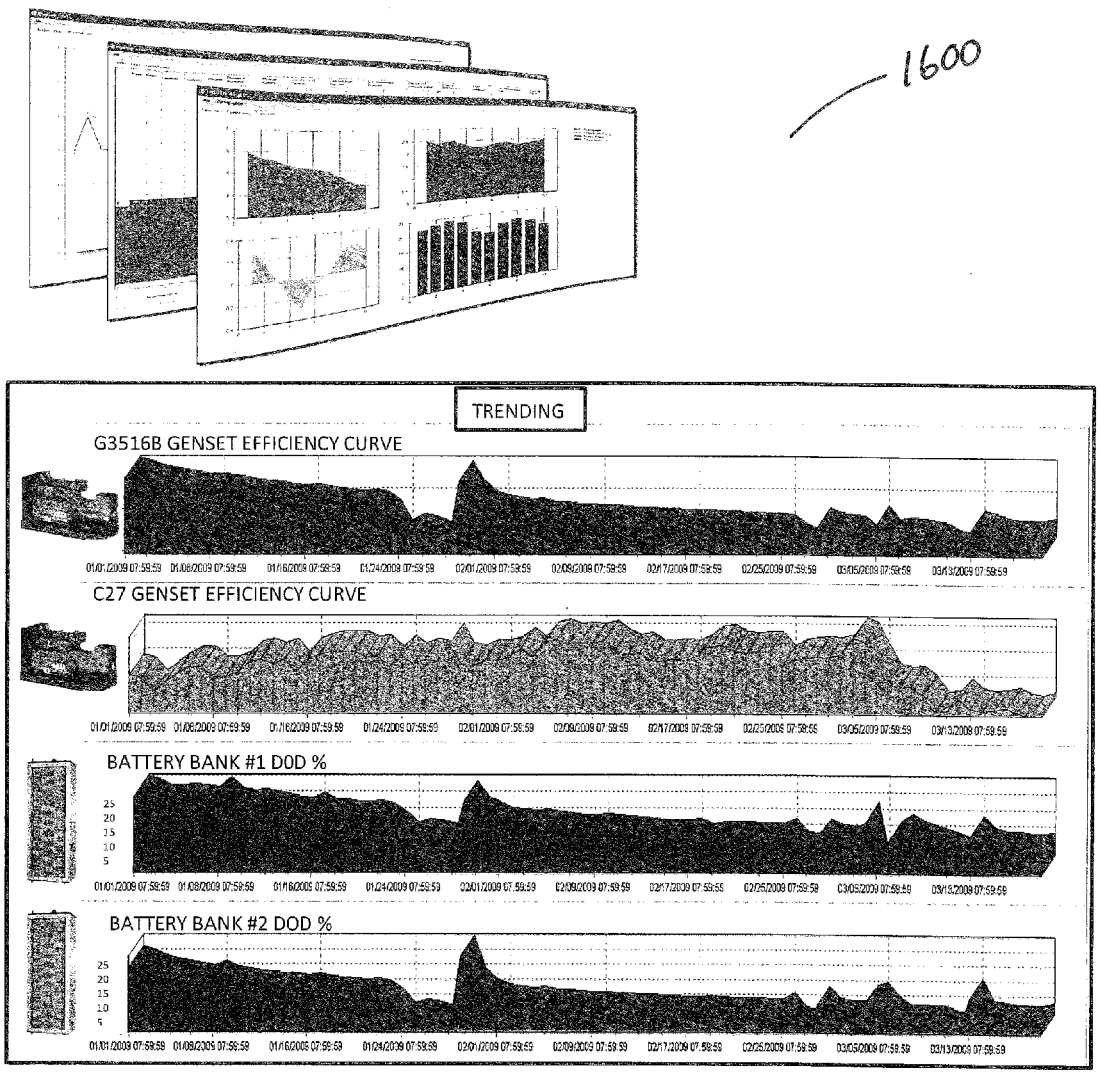
FIG. 16 are screen captures illustrating various example drilling rig site operator interface monitoring screens in accordance with an embodiment of the invention; and, FIG. 17 is a flow chart illustrating operations of modules within a data processing system for controlling a portable power system in accordance with an embodiment of the invention.

FIG. 16 are screen captures illustrating various example drilling rig site operator interface monitoring screens 1600 in accordance with an embodiment of the invention.

The detailed operation of the portable power system 100 may be further illustrated with the aid of a flowchart.

Figure 17:
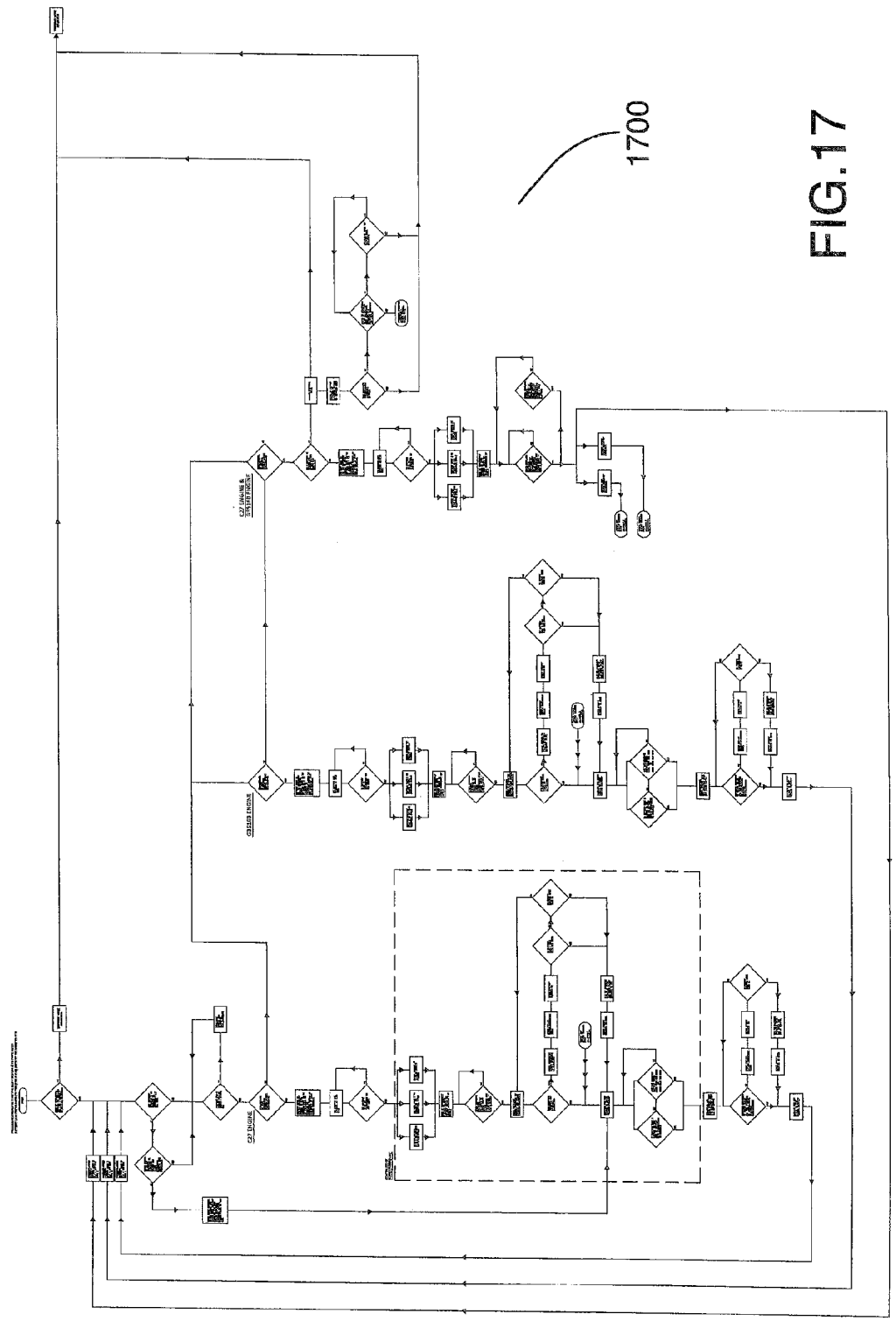
Figure 17:
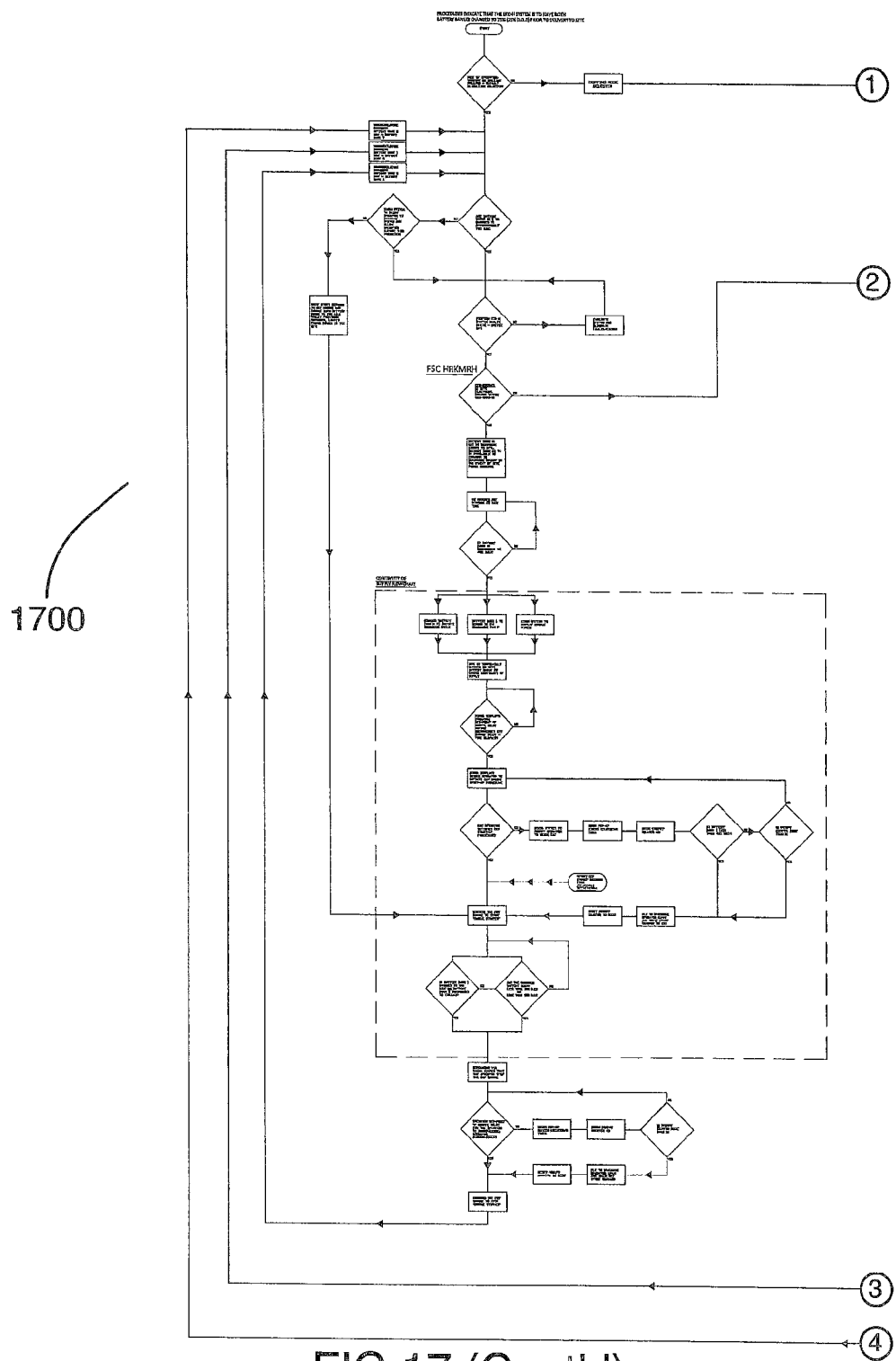
Figure 17:
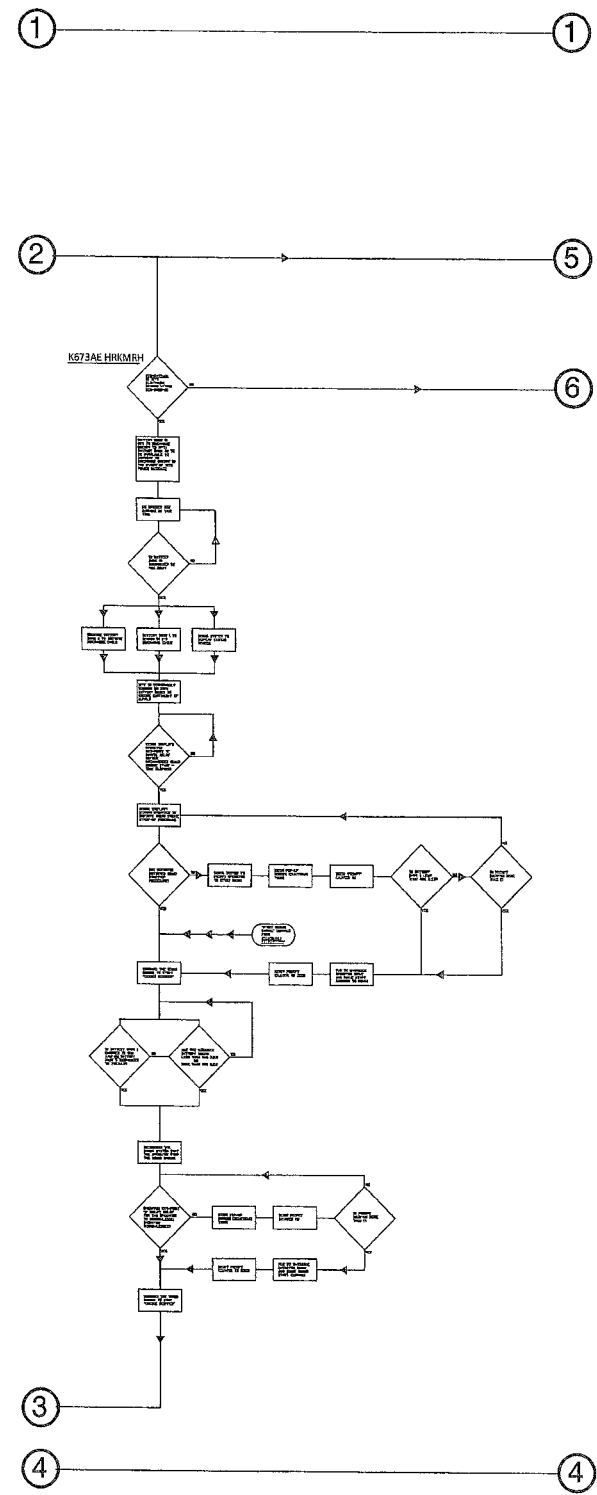
Figure 17:
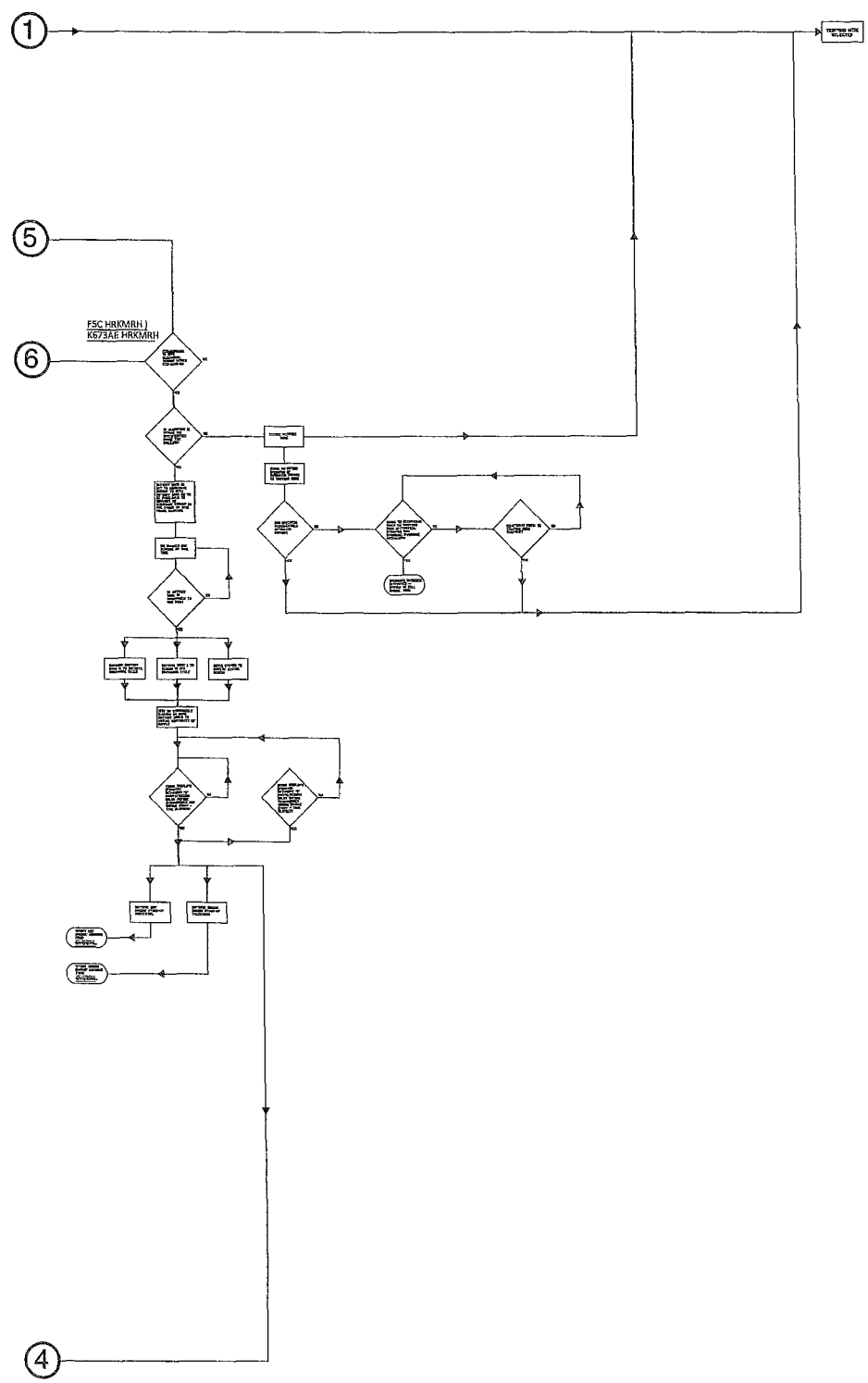
Figure 17:
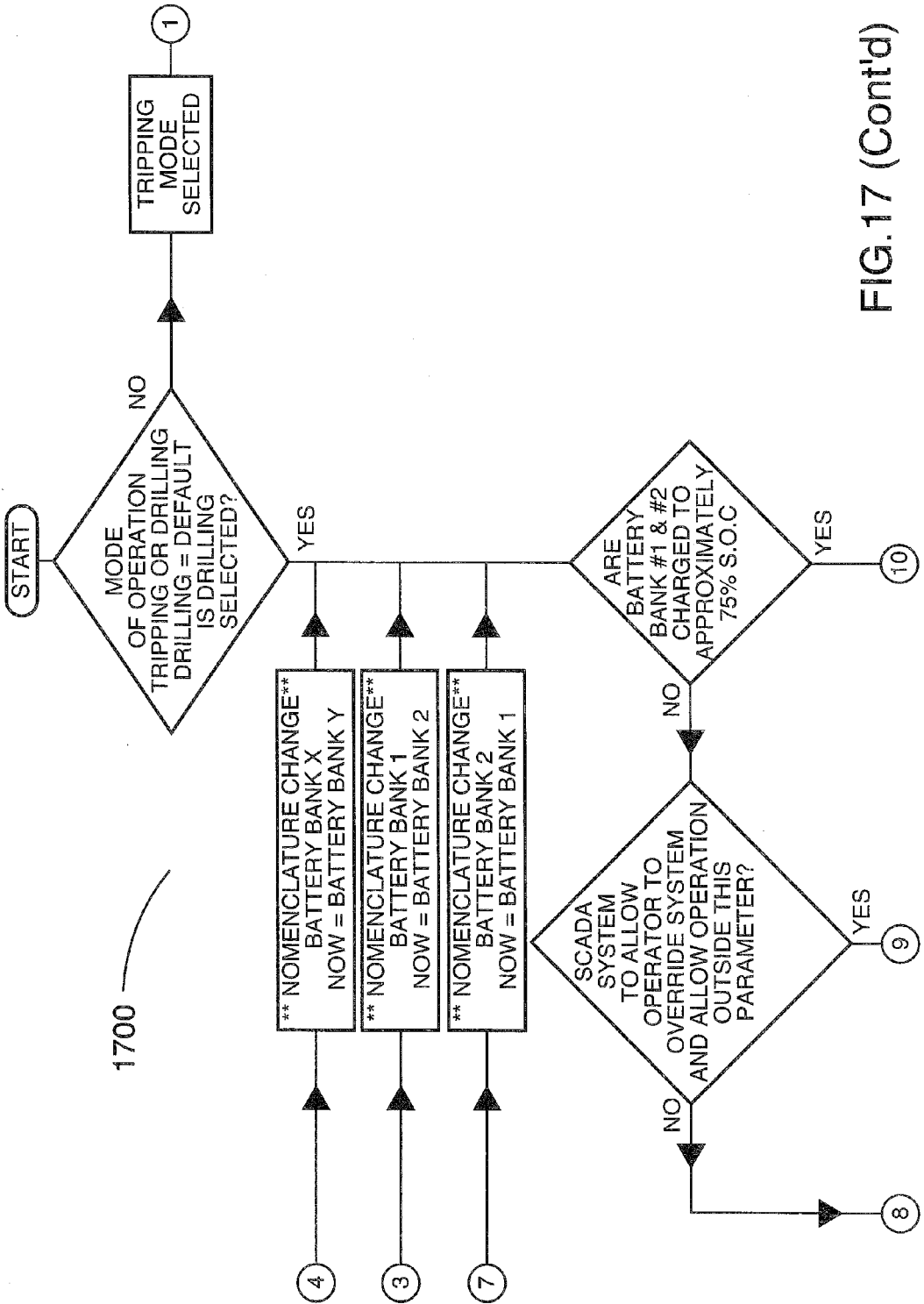
Figure 17:
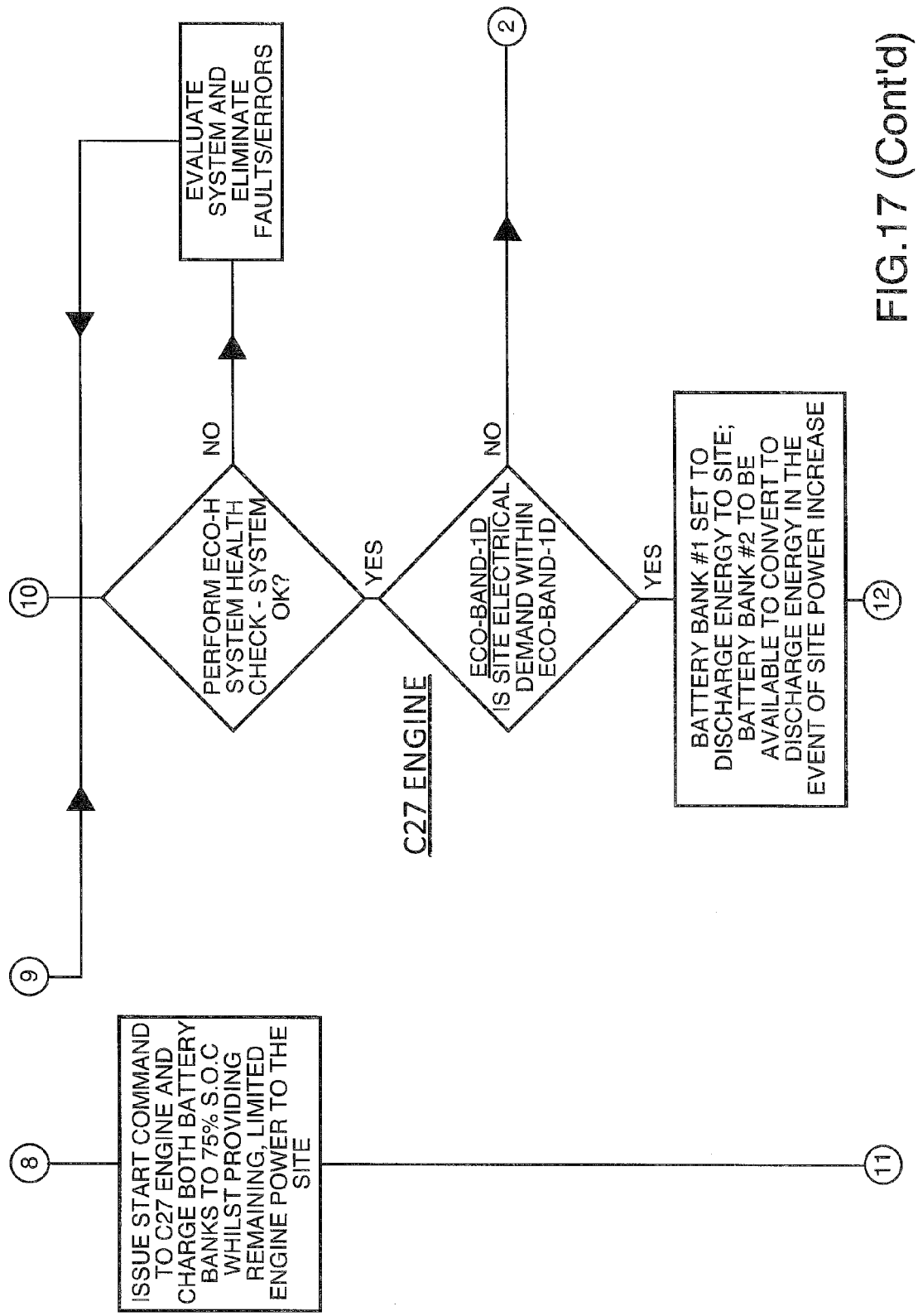
Figure 17:
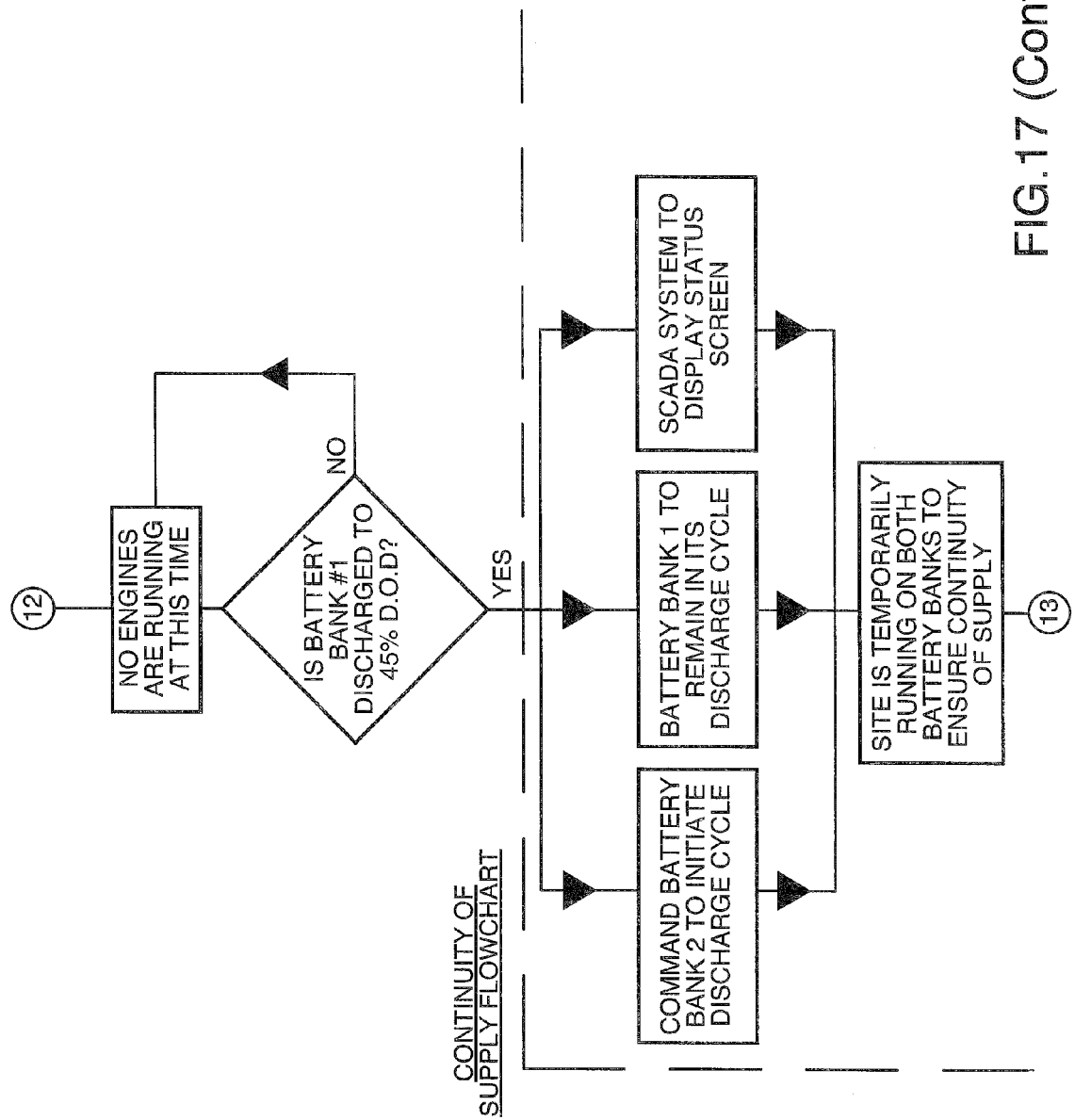
Figure 17:
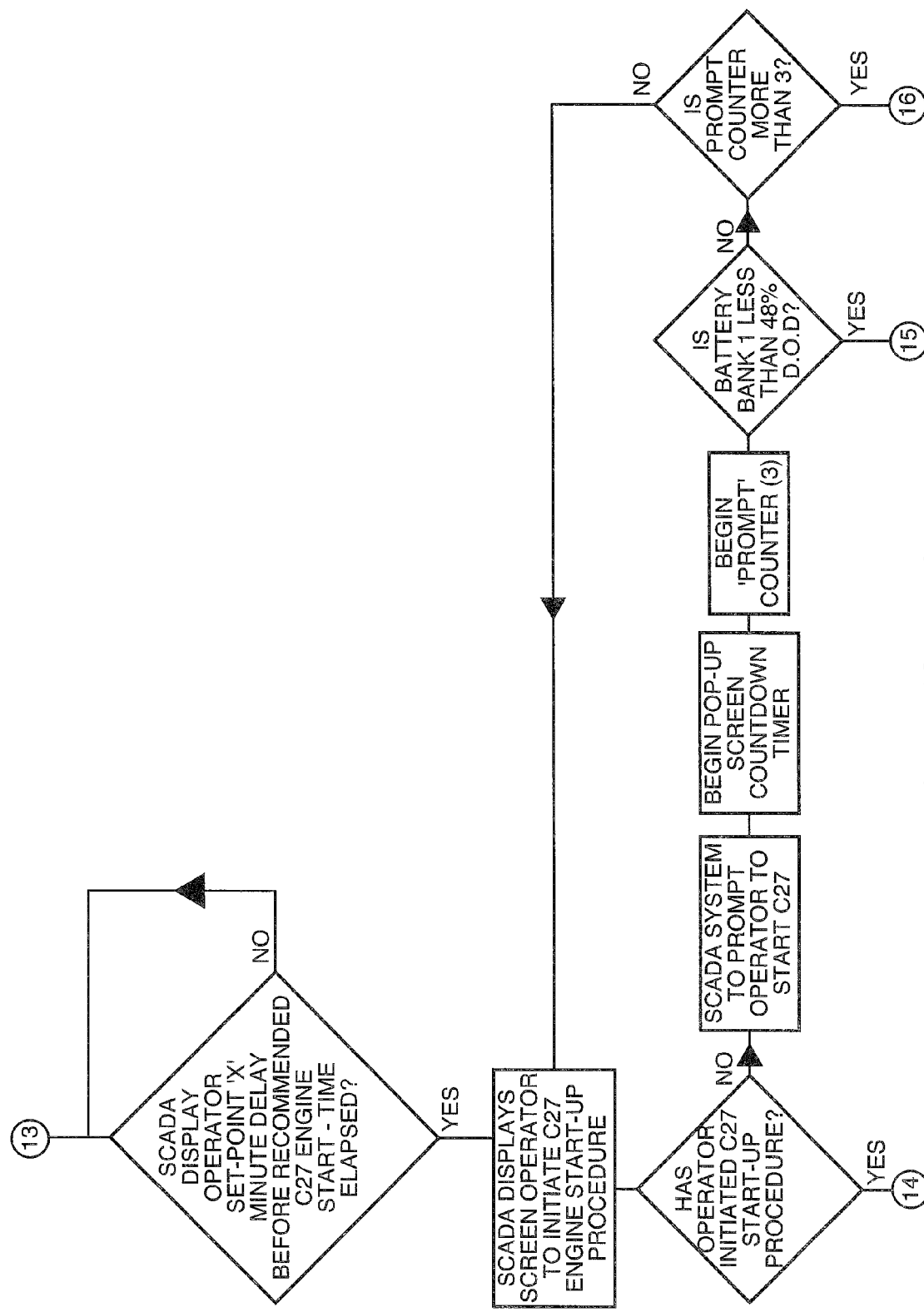
Figure 17:
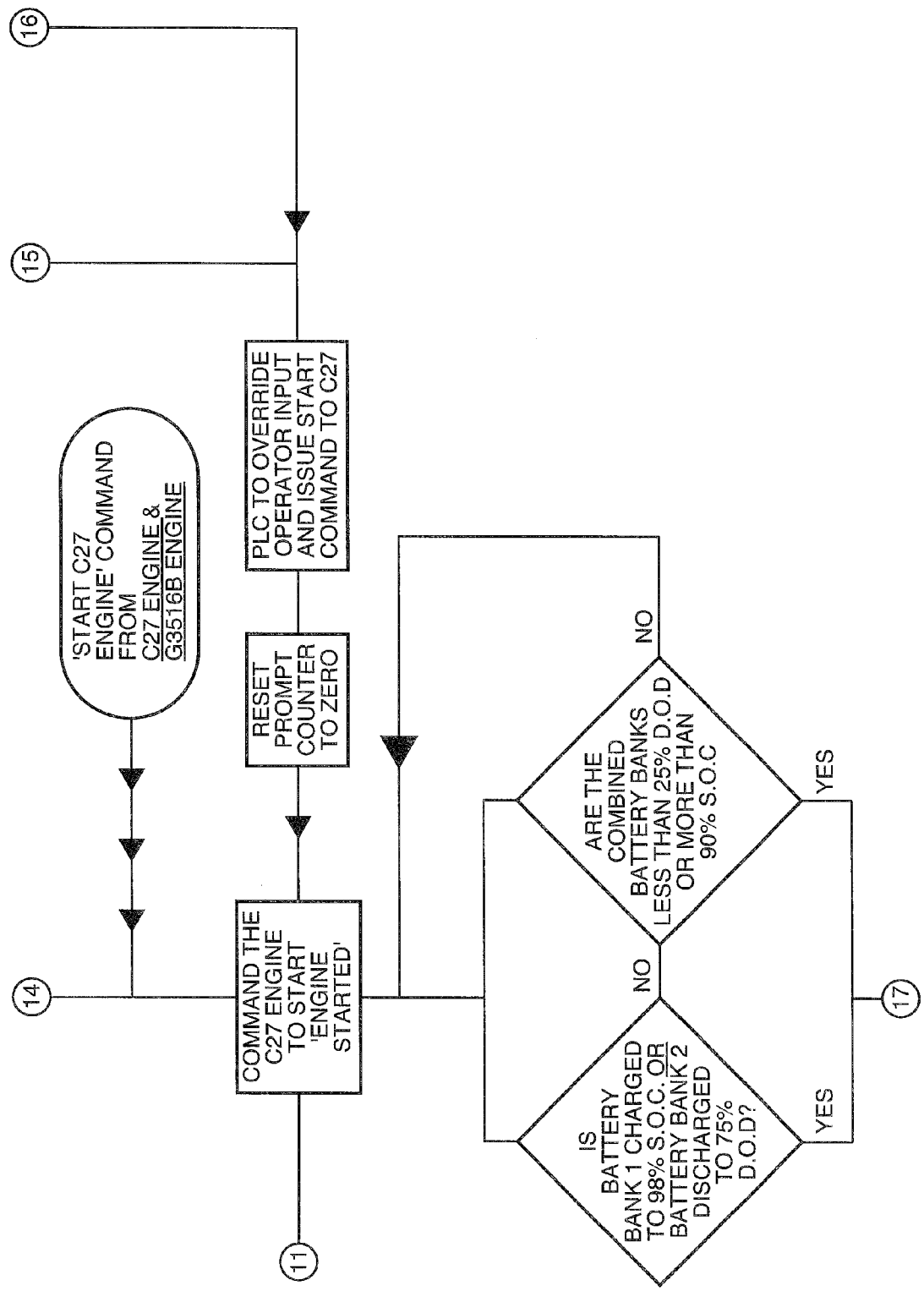
Figure 17:
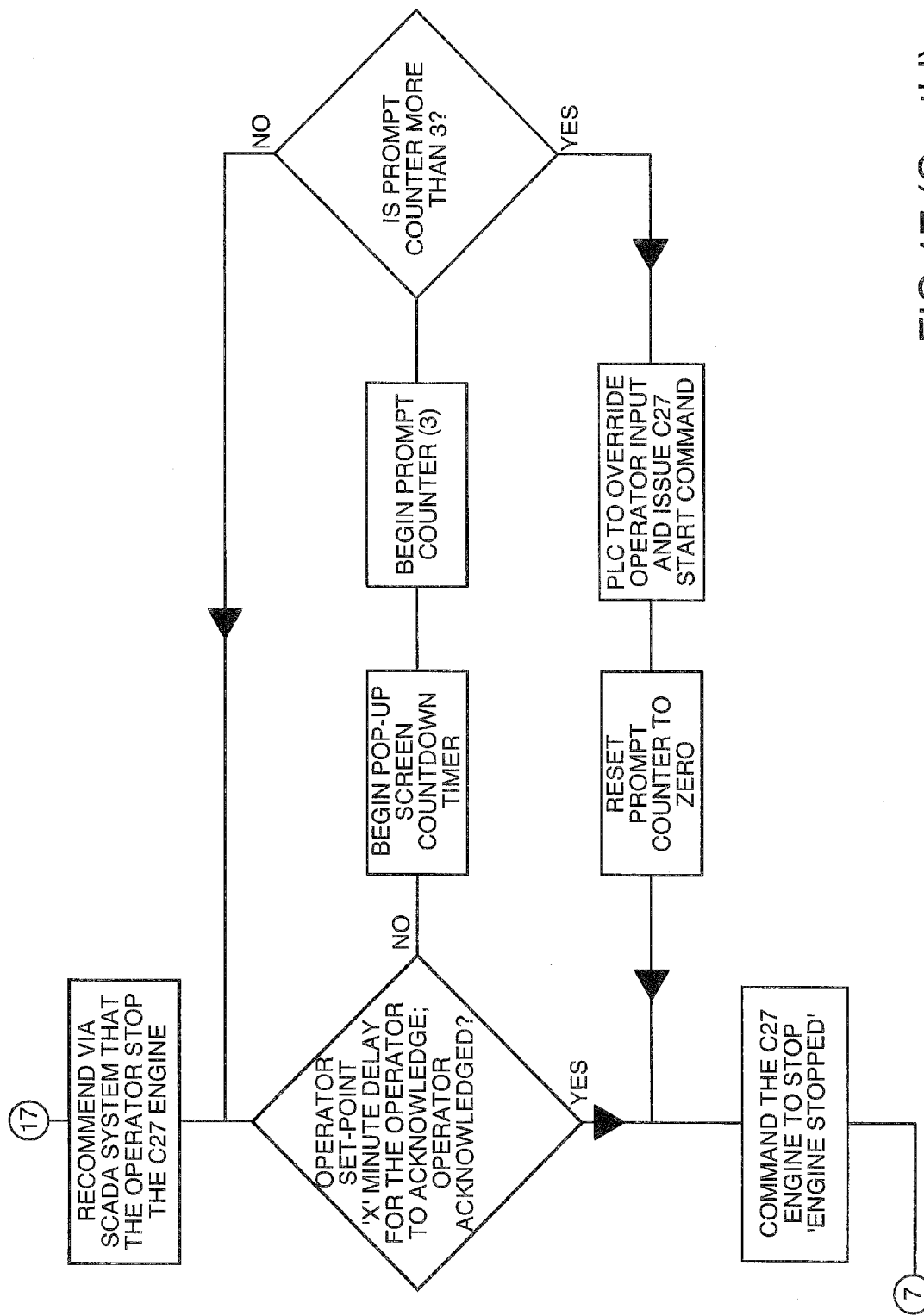
Figure 17:
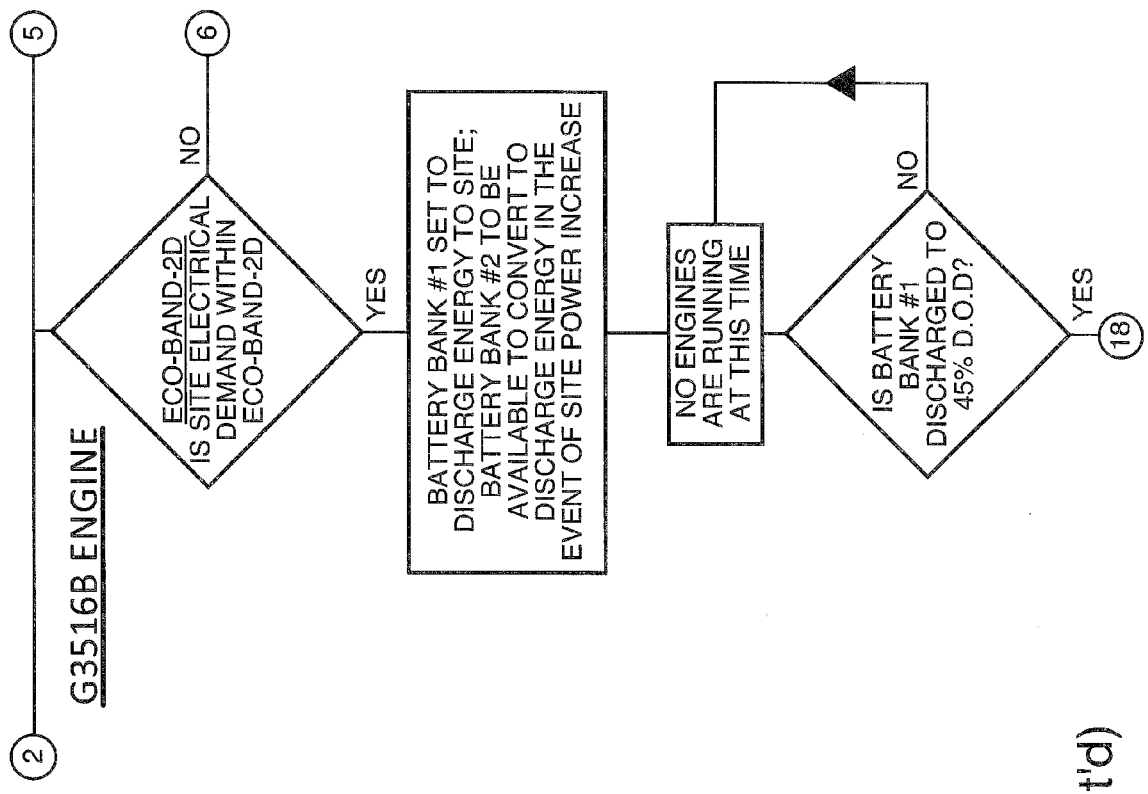
Figure 17:
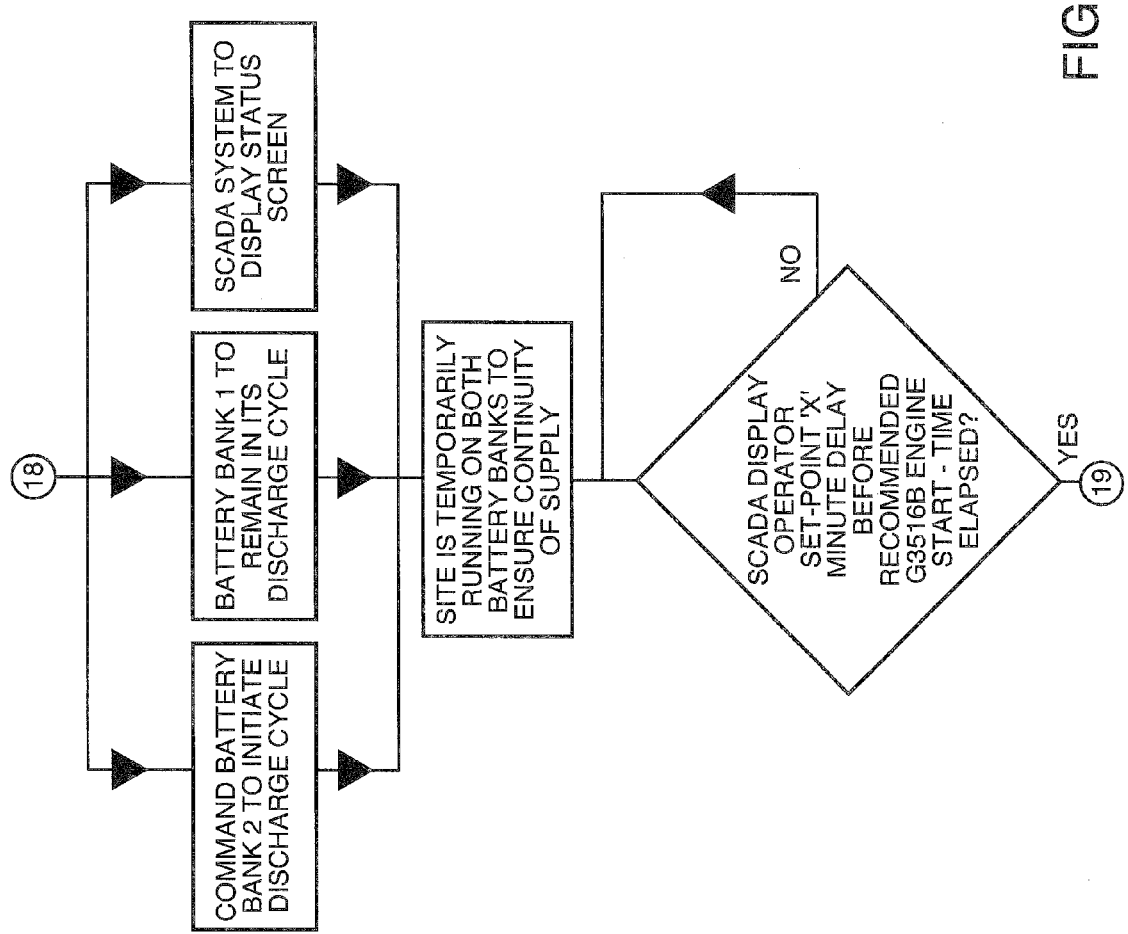
Figure 17:
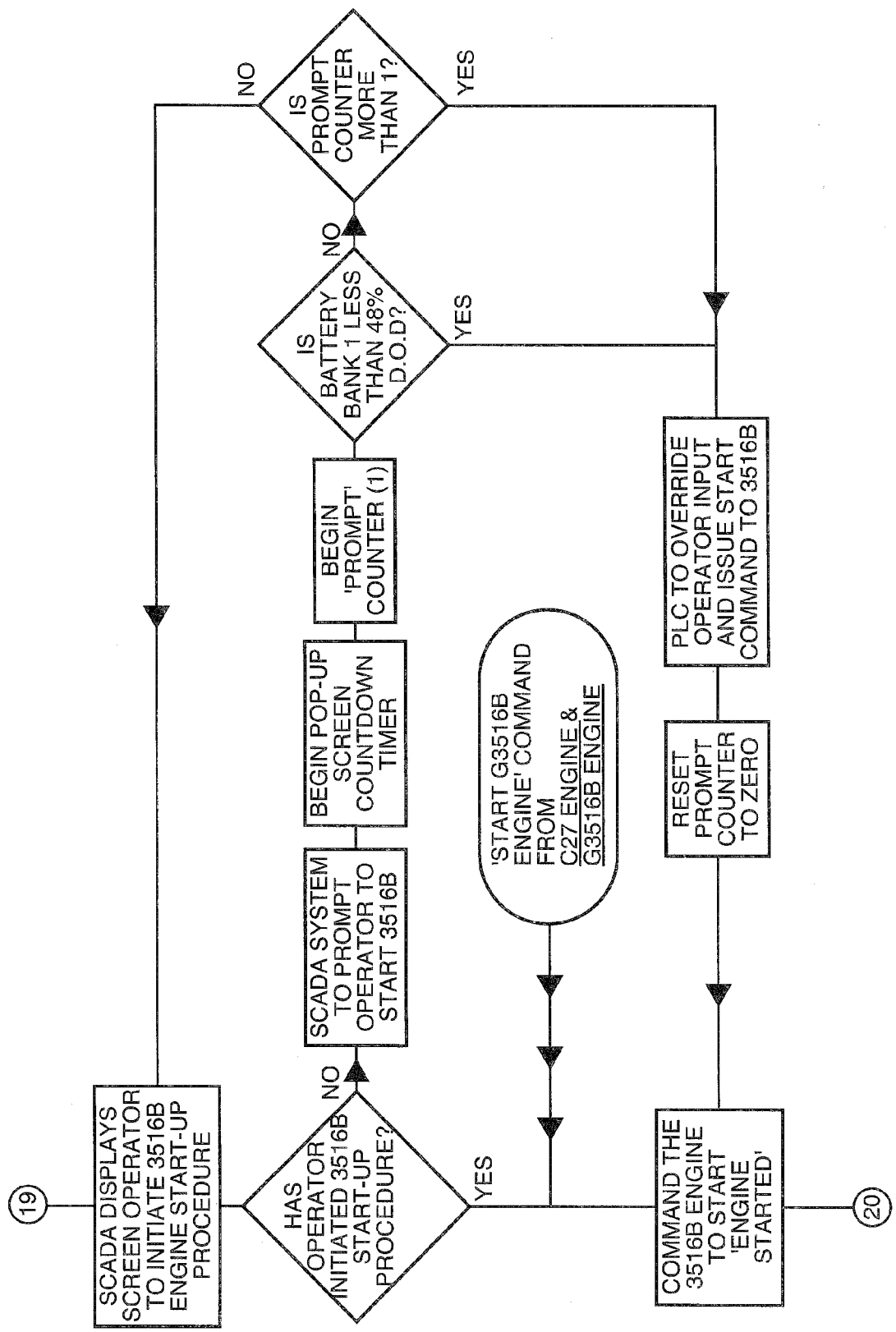
Figure 17:
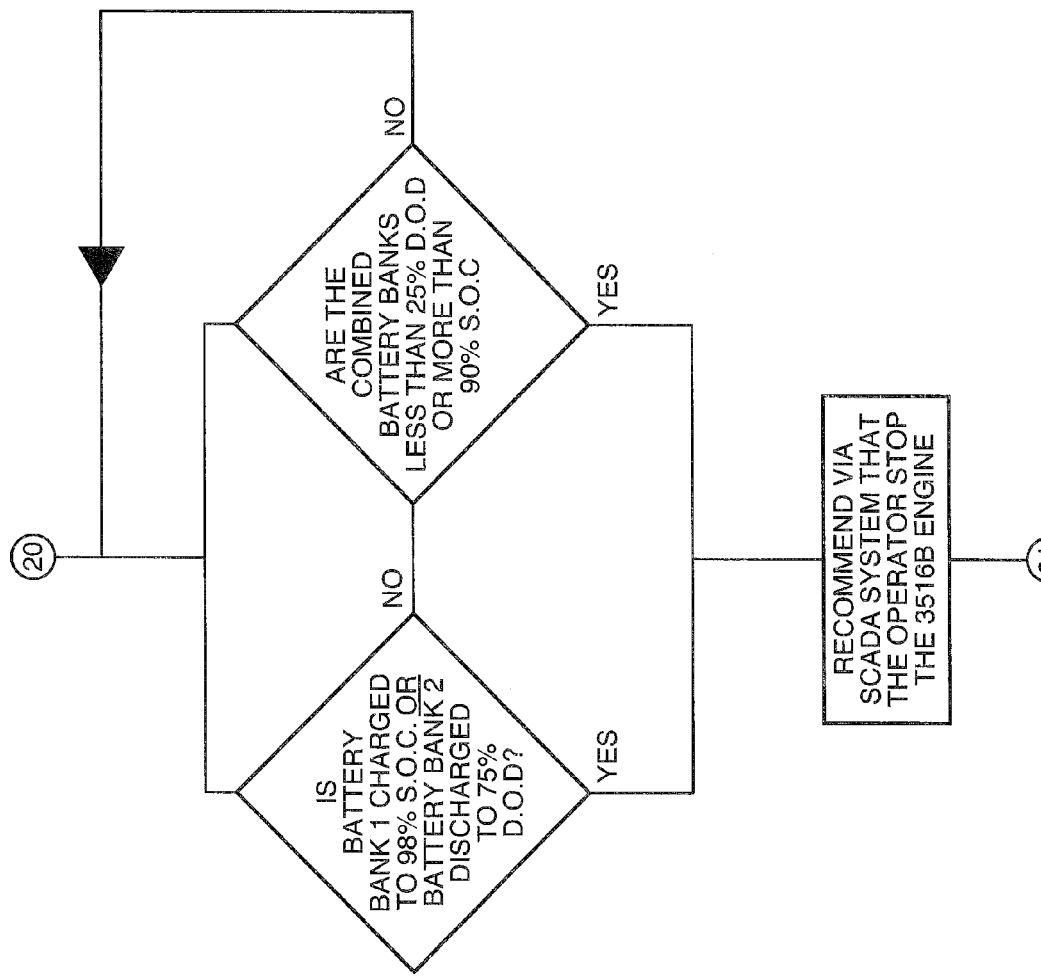
Figure 17:
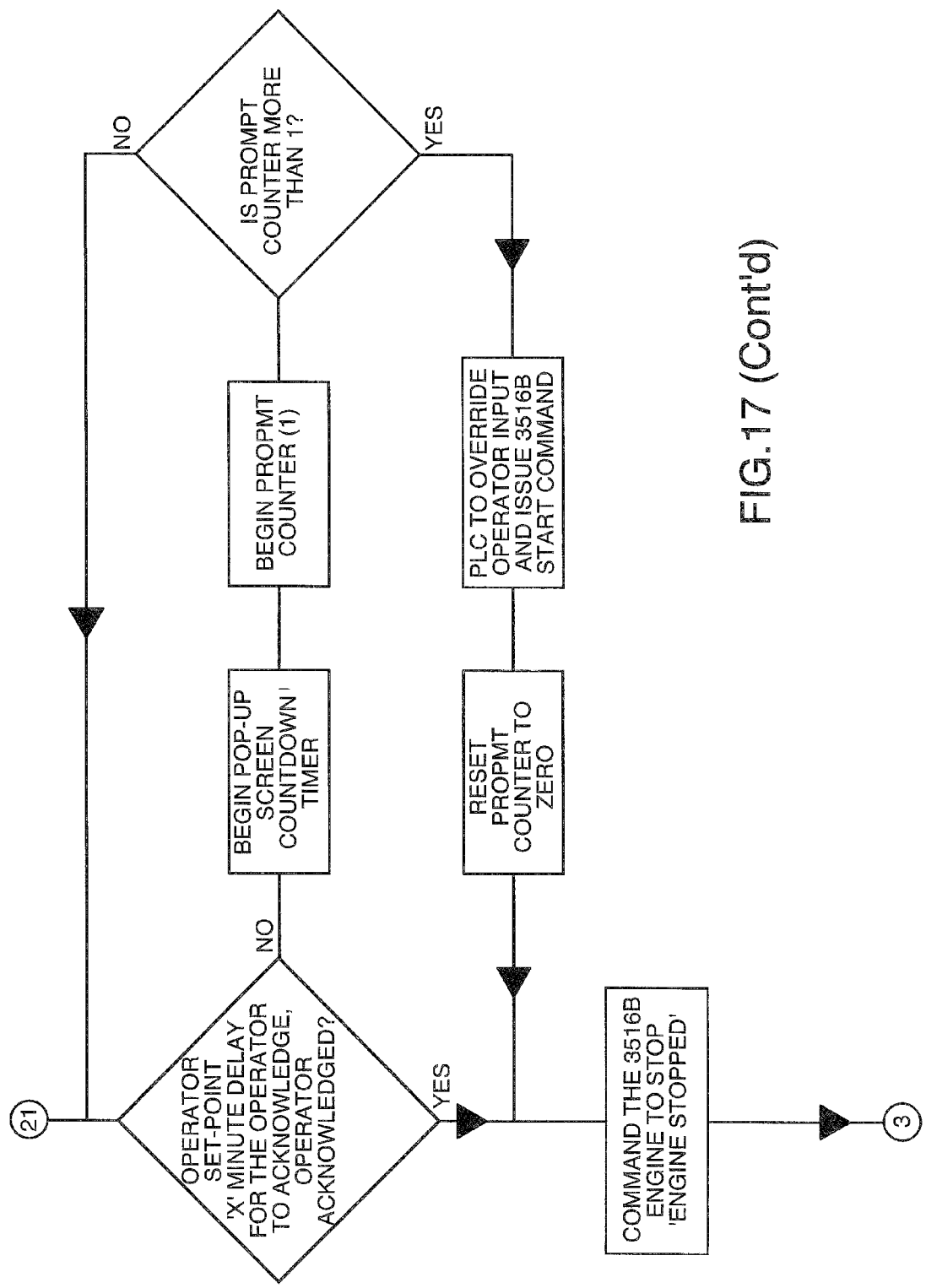
Figure 17:
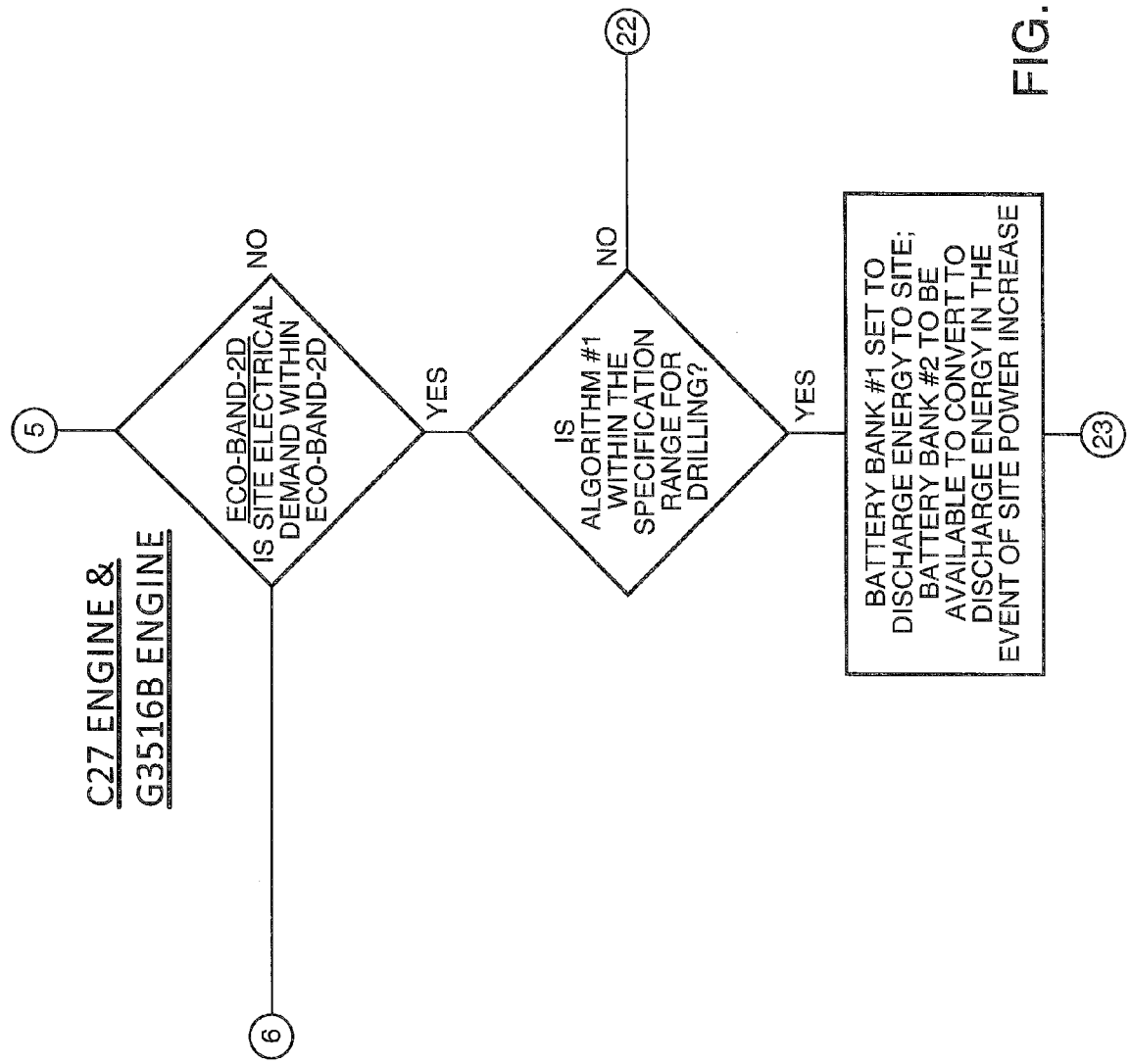
Figure 17:
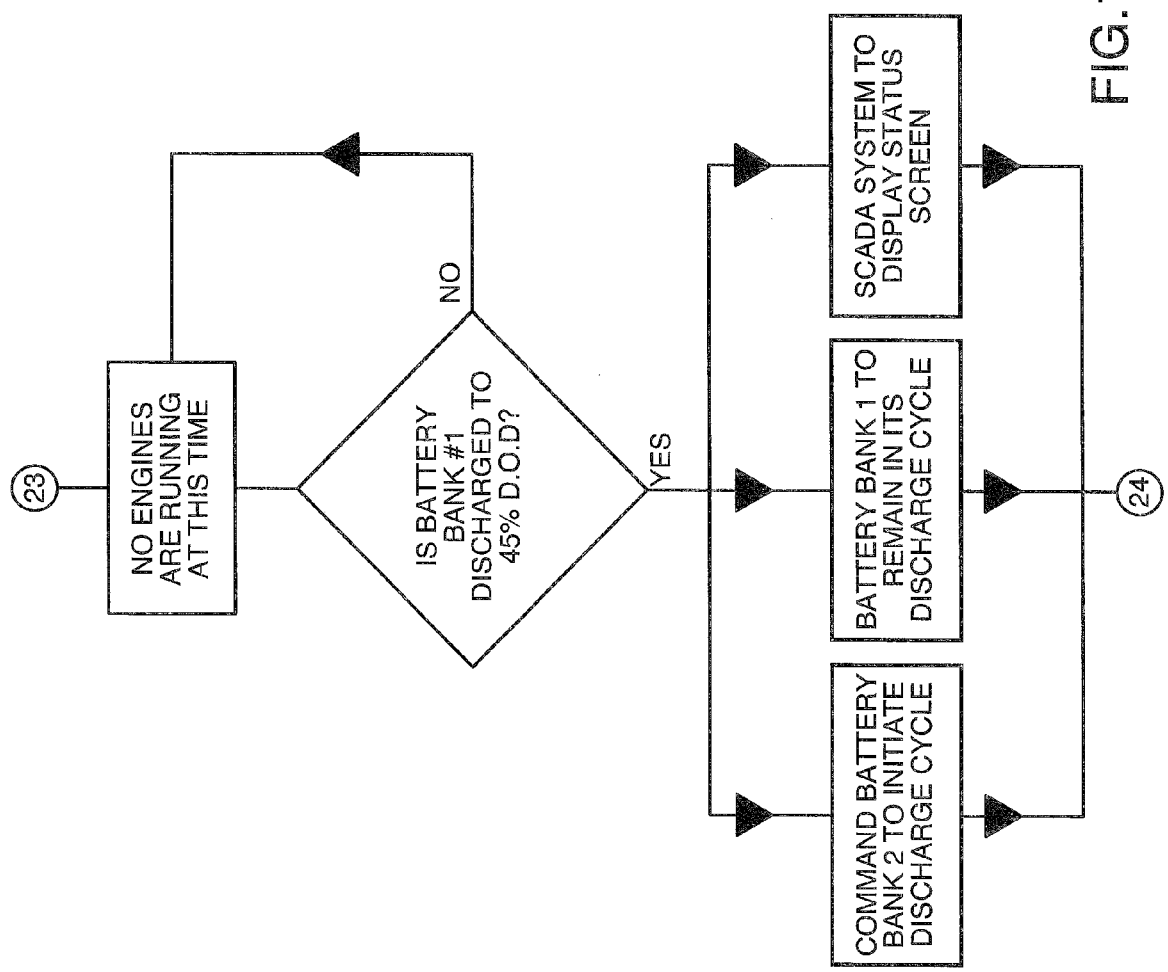
Figure 17:
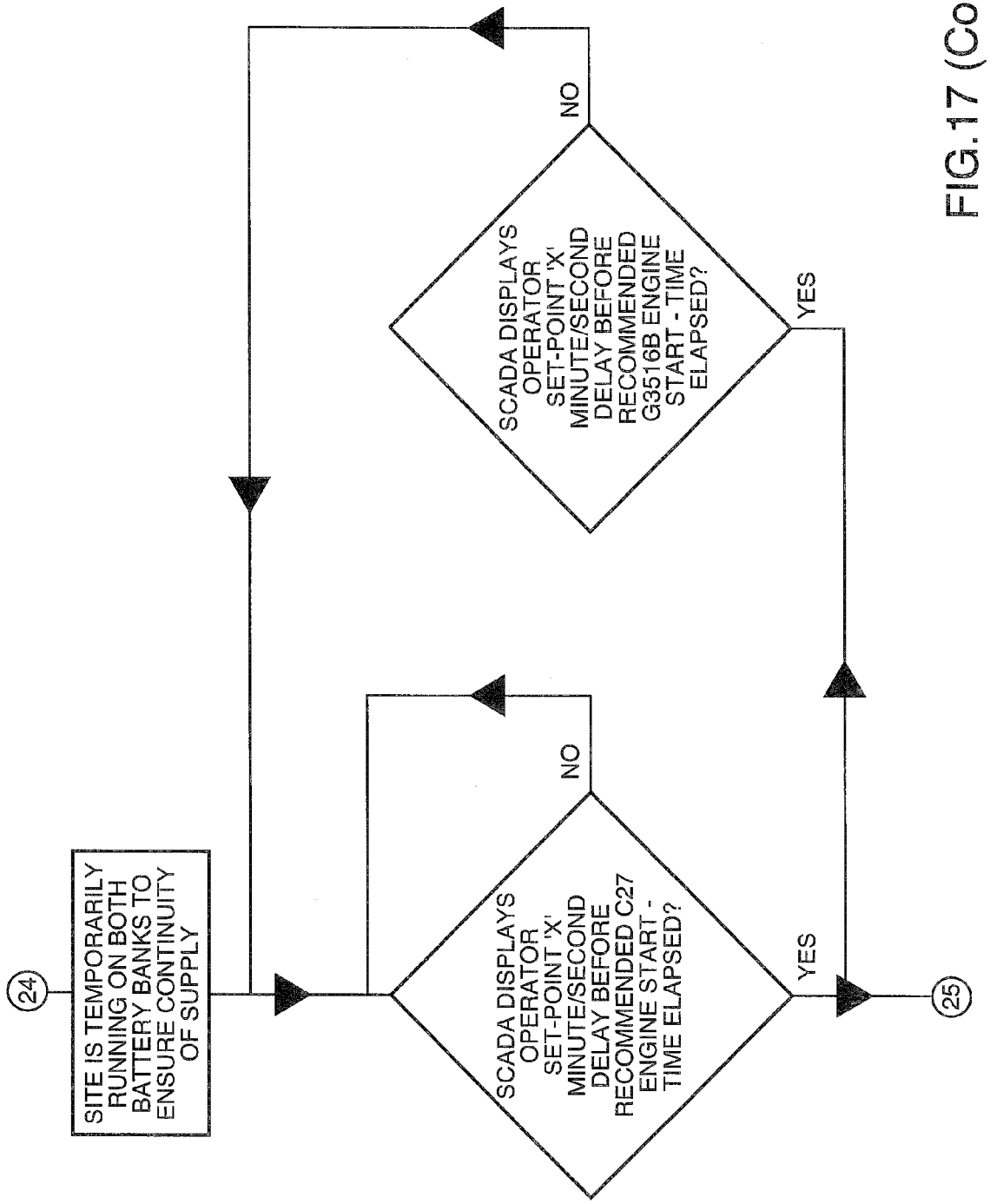
Figure 17:
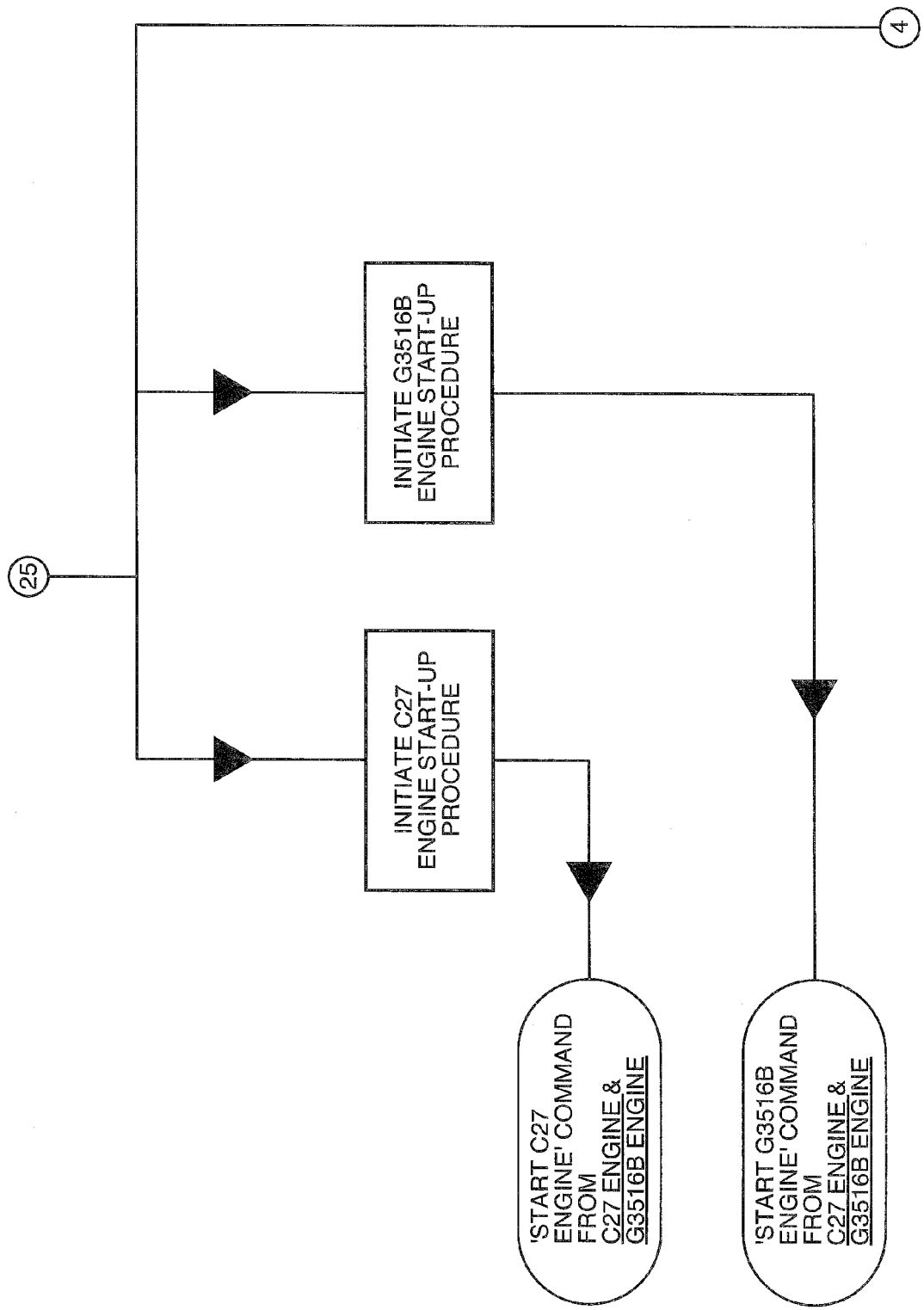
Figure 17:
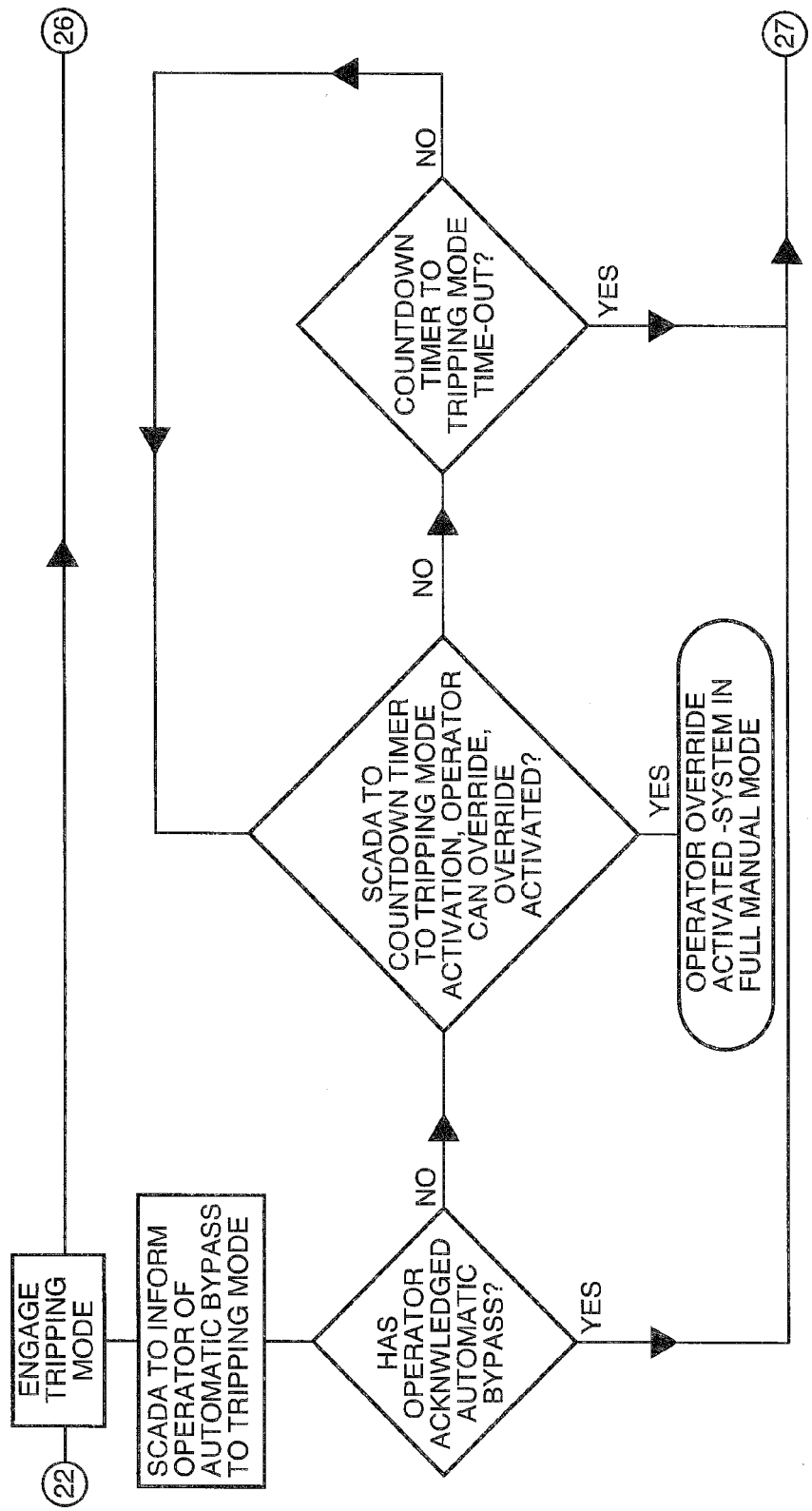
Figure 17:
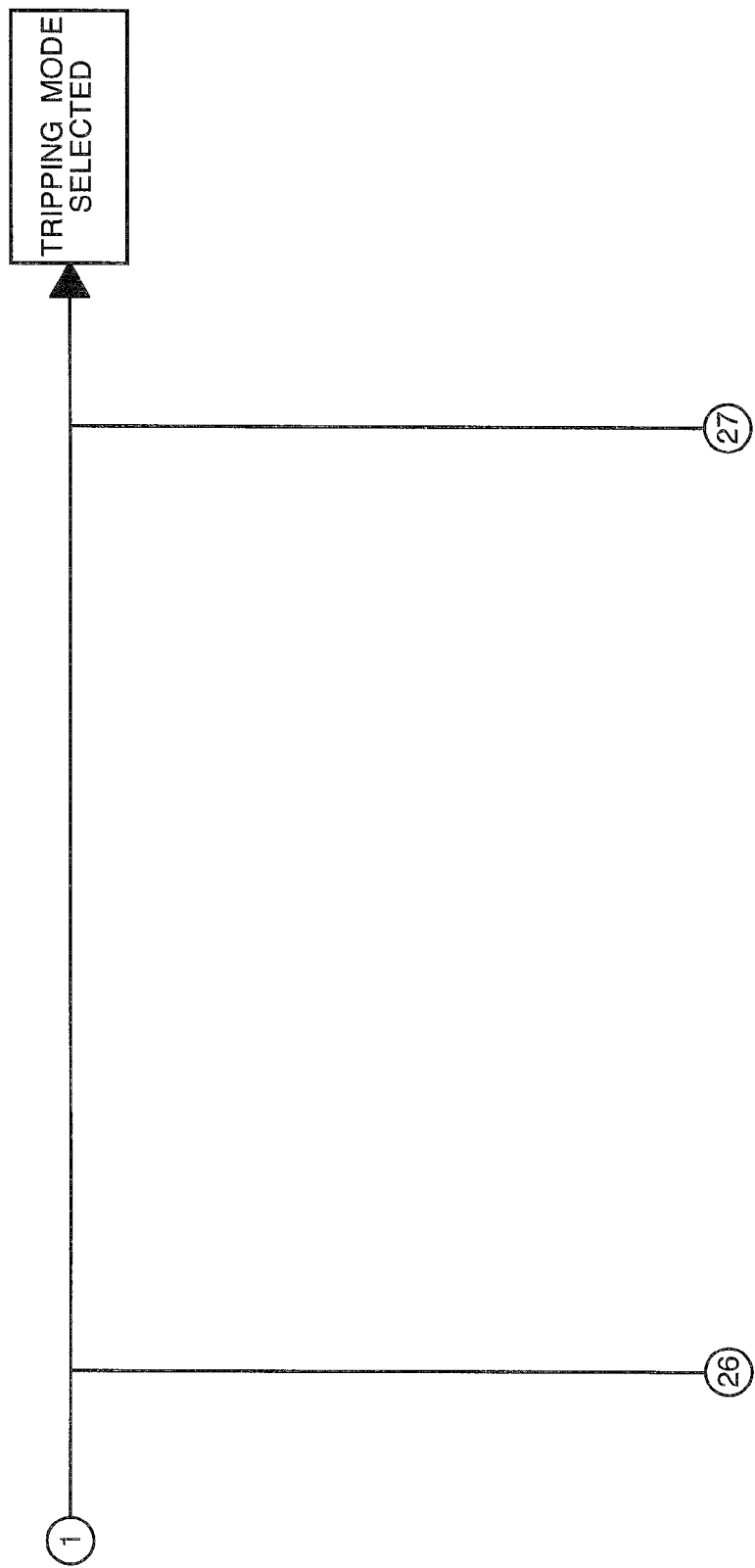

FIG. 17 is a flow chart illustrating operations 1700 of modules (e.g., software or hardware modules 331, 321) within a data processing system 300 for controlling a portable power system 100 in accordance with an embodiment of the invention. The modules 331, 321 may be located in the data processing system or control system 300, in the drilling rig site's SCADA system 301, or distributed between the data processing system 300 and the drilling rig site's SCADA system 301.

Thus, according to one embodiment, there is provided a method for controlling a portable power system 100, comprising: using a processor 320, selecting an engine efficiency range for a engine (e.g., C27) of a generator set 240 of the portable power system 100, the engine efficiency range corresponding to a power output range of the generator set 240 and to a power demand of a load coupled to the portable power system 100; when the power demand of the load is less than the power output of the generator set 240, storing excess power from the generator set 240 in a first battery bank 110 of the portable power system 100; when the power demand of the load is greater than the power output of the generator set 240, providing additional power to the load from a second battery bank 210 of the portable power system 100; and, when at least one of a predetermined depth of discharge threshold is reached by the second battery bank 210 and a predetermined state of charge threshold is reached by the first battery bank 110, switching between the second battery bank 210 and the first battery bank 110.

In the above method, the predetermined depth of discharge threshold may be 50% or approximately 50%. The predetermined state of charge threshold may be 100% or approximately 100%. The first battery bank 110 and the second battery bank 210 each contain one or more lithium-ion batteries. The engine may be one of a liquid natural gas engine (e.g., G3516B) and a diesel engine (e.g., C27). The method may further include, when the power demand of the load is less than the power output of the generator set 240, providing power to the load from the generator set 240 in addition to storing the excess power from the generator set 240 in the first battery bank 110 of the portable power system 100. The method may further include, when the power demand of the load is greater than the power output of the generator set 240, providing power to the load from the generator set 240 in addition to providing the additional power to the load from the second battery bank 210 of the portable power system 100. The portable power system 100 may include another generator set 140 having another engine (e.g., G3516B). The method may further include selecting a set of predetermined operating states 410 for the portable power system 100 using the engine efficiency range. And, the method may further include controlling the generator set 240, the first battery bank 110, and the second battery bank 210 in accordance with the set of predetermined operating states 410.

The above embodiments may contribute to an improved method and system for controlling a portable power system 100 and may provide one or more advantages. First, the system 100 may be a containerized system mounted on a single skid or trailer to facilitate mobility. Second, the system 100 provides improved battery bank 110, 210 life. Third, the system 100 provides improved generator set 140, 240 engine efficiency.

While aspects of this invention may be primarily discussed as a method, a person of ordinary skill in the art will understand that the apparatus discussed above with reference to a data processing system 300 may be programmed to enable the practice of the method of the invention. Moreover, an article of manufacture for use with a data processing system 300, such as a pre-recorded storage device or other similar computer readable medium or product including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 may be contained in a data carrier product according to one embodiment of the invention. This data carrier product may be loaded into and run by the data processing system 300. In addition, the sequences of instructions which when executed cause the method described herein to be performed by the data processing system 300 may be contained in a computer software product or computer program product (e.g., comprising a non-transitory medium) according to one embodiment of the invention. This computer software product or computer program product may be loaded into and run by the data processing system 300. Moreover, the sequences of instructions which when executed cause the method described herein to be performed by the data processing system 300 may be contained in an integrated circuit product (e.g., a hardware module or modules 321) which may include a coprocessor or memory according to one embodiment of the invention. This integrated circuit product may be installed in the data processing system 300.

The embodiments of the invention described above are intended to be examples only. Those skilled in this art will understand that various modifications of detail may be made to these embodiments, all of which come within the scope of the invention.

What is claimed is:

1. A method for controlling a portable power system, comprising:
    using a processor, selecting an engine efficiency range for an engine of a generator set of the portable power system, the engine efficiency range corresponding to a power output range of the generator set and to a power demand of a load coupled to the portable power system;
    when the power demand of the load is less than the power output of the generator set, storing excess power from the generator set in a first battery bank of the portable power system;
    when the power demand of the load is greater than the power output of the generator set, providing additional power to the load from a second battery bank of the portable power system; and,
    when at least one of a predetermined depth of discharge threshold is reached by the second battery bank and a predetermined state of charge threshold is reached by the first battery bank, switching between the second battery bank and the first battery bank.

2. The method of claim 1 wherein the predetermined depth of discharge threshold is 50% or approximately 50%.

3. The method of claim 1 wherein the predetermined state of charge threshold is 100% or approximately 100%.

4. The method of claim 1 wherein the first battery bank and the second battery bank each contain one or more lithium-ion batteries.

5. The method of claim 1 wherein the engine is one of a liquid natural gas engine and a diesel engine.

6. The method of claim 1, further comprising, when the power demand of the load is less than the power output of the generator set, providing power to the load from the generator set in addition to storing the excess power from the generator set in the first battery bank of the portable power system.

7. The method of claim 1, further comprising, when the power demand of the load is greater than the power output of the generator set, providing power to the load from the generator set in addition to providing the additional power to the load from the second battery bank of the portable power system.

8. The method of claim 1 wherein the portable power system includes another generator set having another engine.

9. The method of claim 1, further comprising selecting a set of predetermined operating states for the portable power system using the engine efficiency range.

10. The method of claim 9, further comprising, controlling the generator set, the first battery bank, and the second battery bank in accordance with the set of predetermined operating states.

11. The control system of claim 1 wherein the portable power system includes another generator set having another engine.

12. A control system for controlling a portable power system, comprising:
- a processor coupled to memory, a generator set, a first battery bank, and a second battery bank; and,
- at least one of hardware and software modules within the memory and controlled or executed by the processor, the modules including:
  - a module for selecting an engine efficiency range for an engine of the generator set of the portable power system, the engine efficiency range corresponding to a power output range of the generator set and to a power demand of a load coupled to the portable power system;
  - a module for, when the power demand of the load is less than the power output of the generator set, storing excess power from the generator set in the first battery bank of the portable power system;
  - a module for, when the power demand of the load is greater than the power output of the generator set, providing additional power to the load from the second battery bank of the portable power system; and,
  - a module for, when at least one of a predetermined depth of discharge threshold is reached by the second battery bank and a predetermined state of charge threshold is reached by the first battery bank, switching between the second battery bank and the first battery bank.

13. The control system of claim 12 wherein the predetermined depth of discharge threshold is 50% or approximately 50%.

14. The control system of claim 12 wherein the predetermined state of charge threshold is 100% or approximately 100%.

15. The control system of claim 12 wherein the first battery bank and the second battery bank each contain one or more lithium-ion batteries.

16. The control system of claim 12 wherein the engine is one of a liquid natural gas engine and a diesel engine.

17. The control system of claim 12, further comprising, a module for, when the power demand of the load is less than the power output of the generator set, providing power to the load from the generator set in addition to storing the excess power from the generator set in the first battery bank of the portable power system.

18. The control system of claim 12, further comprising, a module for, when the power demand of the load is greater than the power output of the generator set, providing power to the load from the generator set in addition to providing the additional power to the load from the second battery bank of the portable power system.

19. The system of claim 12, further comprising a module for selecting a set of predetermined operating states for the portable power system using the engine efficiency range.

20. The system of claim 19, further comprising a module for controlling the generator set, the first battery bank, and the second battery bank in accordance with the set of predetermined operating states.

* * * * *